United States Patent
Nakura et al.

(10) Patent No.: US 7,674,556 B2
(45) Date of Patent: Mar. 9, 2010

(54) NON-AQUEOUS ELECTROLYTE SECONDARY BATTERY AND METHOD FOR CHARGING THE SAME

(75) Inventors: Kensuke Nakura, Hirakata (JP); Takafumi Oura, Shijonawate (JP); Mitsuhiro Takeno, Settsu (JP); Shuji Tsutsumi, Ikoma (JP); Kazuhiro Okamura, Hirakata (JP)

(73) Assignee: Panasonic Corporation, Osaka (JP)

( * ) Notice: Subject to any disclaimer, the term of this patent is extended or adjusted under 35 U.S.C. 154(b) by 414 days.

(21) Appl. No.: 10/447,011

(22) Filed: May 28, 2003

(65) Prior Publication Data
US 2003/0228519 A1 Dec. 11, 2003

(30) Foreign Application Priority Data
May 30, 2002 (JP) .............................. 2002-157167

(51) Int. Cl.
H01M 4/58 (2006.01)
H01M 4/00 (2006.01)
H01M 2/18 (2006.01)
H02J 7/04 (2006.01)
H02J 7/16 (2006.01)

(52) U.S. Cl. .................. 429/231.95; 429/223; 429/224; 429/231.3; 320/139; 320/141

(58) Field of Classification Search ................ 429/223, 429/224, 231.3, 231.95; 320/139, 141
See application file for complete search history.

(56) References Cited

U.S. PATENT DOCUMENTS

| | | | |
|---|---|---|---|
| 5,264,201 A * | 11/1993 | Dahn et al. | ............... 252/519.1 |
| 5,442,274 A * | 8/1995 | Tamai | ......................... 320/146 |
| 5,576,608 A | 11/1996 | Nagai et al. | |
| 5,604,418 A | 2/1997 | Andrieu et al. | |
| 5,637,981 A | 6/1997 | Nagai et al. | |
| 5,686,815 A * | 11/1997 | Reipur et al. | ................ 320/116 |
| 6,094,034 A * | 7/2000 | Matsuura | ..................... 320/134 |
| 6,335,119 B1 * | 1/2002 | Maruta | ......................... 429/223 |
| 6,379,842 B1 * | 4/2002 | Mayer | ..................... 429/231.3 |
| 6,623,886 B2 | 9/2003 | Yang et al. | |
| 6,746,800 B1 * | 6/2004 | Sunagawa et al. | ........ 429/231.1 |

FOREIGN PATENT DOCUMENTS

| | | |
|---|---|---|
| JP | 04123771 A | 4/1992 |
| JP | 07-320785 | 12/1995 |
| JP | 07-335262 | 12/1995 |

(Continued)

Primary Examiner—Patrick Ryan
Assistant Examiner—Julian Mercado
(74) Attorney, Agent, or Firm—Panitch Schwarze Belisario & Nadel LLP

(57) ABSTRACT

A non-aqueous electrolyte secondary battery comprises a negative electrode including a negative electrode active material, a positive electrode including a positive electrode active material, and a non-aqueous electrolyte; the positive electrode active material is $LiNi_{1-y-z}Mn_yCo_zO_2$, wherein y and z satisfy $0<y\leq0.5$, $0\leq z\leq0.5$, and $0<y+z\leq0.75$; and an upper limit voltage for charging the non-aqueous electrolyte secondary battery is 4.25 to 4.70 V.

It is possible to obtain a non-aqueous electrolyte secondary with high capacity, high reliability, and long life by properly setting the composition of a composite oxide of lithium which is a positive electrode active material and the charging conditions of the battery using this composite oxide of lithium as a positive electrode active material as described above.

3 Claims, 7 Drawing Sheets

FOREIGN PATENT DOCUMENTS

| | | | |
|---|---|---|---|
| JP | 08-213015 | | 8/1996 |
| JP | 2000-030750 | A | 1/2000 |
| JP | 2000-133320 | A | 5/2000 |
| JP | 2000-149945 | A | 5/2000 |
| JP | WO 00/52773 | * | 9/2000 |
| JP | 2000-353525 | A | 12/2000 |
| JP | 2001-023617 | A | 1/2001 |
| JP | 2001-035492 | A | 2/2001 |
| JP | 2001-068168 | | 3/2001 |
| JP | 2002-100358 | A | 4/2002 |
| JP | 2002-145623 | A | 5/2002 |

* cited by examiner

F I G. 3
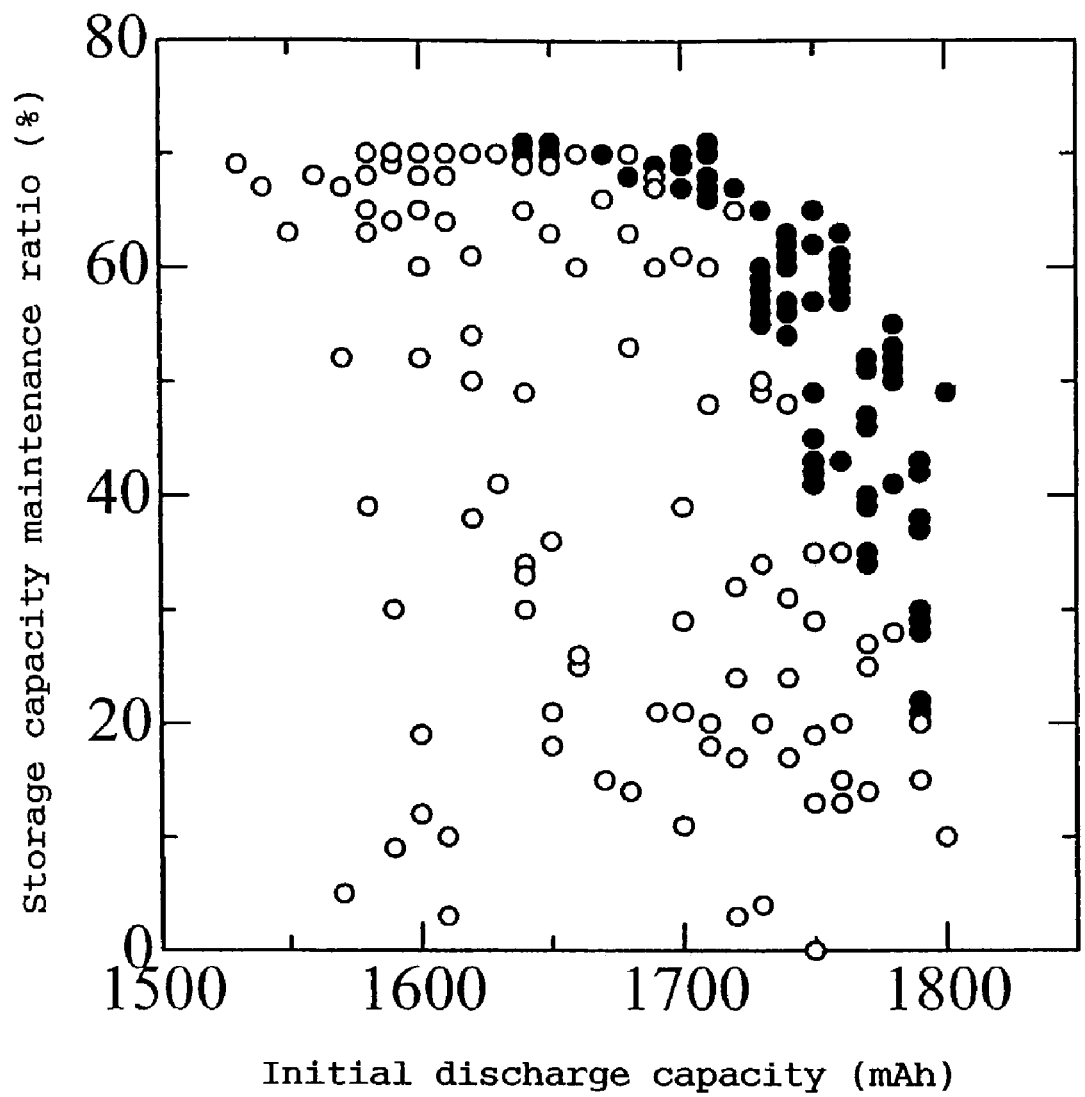

NON-AQUEOUS ELECTROLYTE SECONDARY BATTERY AND METHOD FOR CHARGING THE SAME

BACKGROUND OF THE INVENTION

The present invention relates to a non-aqueous electrolyte secondary battery, and more specifically, to a non-aqueous electrolyte secondary battery using a specific composite oxide of lithium as a positive electrode active material, and a method for charging the battery.

Lithium secondary batteries typical of non-aqueous electrolyte secondary batteries have high electromotive force and high energy density. Because of these features, lithium secondary batteries are now in increasing demand as the main power supply of mobile communication devices and portable electronic devices. Most lithium secondary batteries commercially available at present use as a positive electrode active material $Li_xCoO_2$ (x represents the lithium content in the active material and changes depending on the charging and discharging of the battery). However, since a cobalt compound used as a raw material is expensive, research and development for other positive electrode active materials is going on to find an alternative to $Li_xCoO_2$ with a view toward cost reduction. Of these active materials, a composite oxide of lithium $Li_xCoO_2$ containing nickel as the main component has been studied eagerly and some are already on the market.

Besides cost reduction, lithium secondary batteries are expected to have higher capacity, higher reliability and longer life. To enhance these characteristics, it is possible to improve positive electrode active materials or to set a higher upper limit voltage for charging.

For example, Japanese Unexamined Patent Publication No. 7-320785 discloses a non-aqueous electrolyte secondary battery with a negative electrode containing a carbon material capable of doping and dedoping lithium, a positive electrode containing a composite oxide comprising lithium and a transition metal, and a non-aqueous electrolyte. And, it is proposed to use a graphite material or a carbon material mixture containing graphite as the carbon material, and to use as the above-mentioned composite oxide $Li_xNi_yCo_{1-y}O_2$ (wherein x and y satisfy $0.05 \leq x \leq 1.10$ and $0.3 \leq y \leq 1.0$, respectively), and to set an upper limit voltage for charging to 4.1 V or higher. The object of this invention is to provide a non-aqueous electrolyte secondary battery with high energy density and excellent cycle characteristics.

On the other hand, Japanese Unexamined Patent Publication No. 7-335262 discloses a non-aqueous electrolyte secondary battery with a negative electrode containing as a negative electrode active material a carbon material capable of doping and dedoping lithium, a positive electrode containing as a positive electrode active material a composite oxide of lithium and a transition metal, and a non-aqueous electrolyte. And, it is proposed to use a hard carbon material as the negative electrode active material, and to use as the positive electrode active material $Li_xNi_yCo_{1-y}O_2$ (wherein x and y satisfy $0.05 \leq x \leq 1.10$ and $0.5 \leq y \leq 0.95$, respectively), and to set an upper limit voltage for charging the non-aqueous electrolyte secondary battery to 4.0 V or higher. The object of this invention is to provide a non-aqueous electrolyte secondary battery with high capacity and excellent storage characteristics.

Furthermore, Japanese Unexamined Patent Publication No. 2001-68168 discloses two conditions about a lithium secondary battery which comprises a negative electrode, a positive electrode, and a lithium salt-containing non-aqueous electrolyte, and which can be charged and discharged for a plural number of times in a reversible manner. As one of the conditions, it is proposed to set the charge end voltage at 4.5 to 4.7 V; to set the average discharge voltage of the positive electrode relative to an Li reference potential at 4.0 to 4.4 V; to set the discharge end voltage of the positive electrode relative to the Li reference potential at 3.2 V or higher; and to set the volume energy density at larger than 430 Wh/l.

As the other condition, it is proposed to set the charge end voltage of the positive electrode relative to the Li reference potential at 4.5 to 4.7 V, and to use a positive electrode active material containing a composite oxide of lithium which satisfies a general formula $Li_wM_vCo_xQ_{1-v-x}O_2$ (wherein M is at least one kind selected from G, Ti, Zr, Y, and Si; Q is at least one kind selected from Ni and Fe; and w, v, and x satisfy $0 \leq w \leq 1.2$, $0.01 \leq v \leq 0.2$, and $0.7 \leq x \leq 0.95$, respectively). The object of this invention is to provide a lithium secondary battery durable to high voltage.

By the way, with the rising of the upper limit voltage for charging, more lithium is deintercalated from a composite oxide of lithium as a positive electrode active material, thereby naturally realizing higher capacity.

On the other hand, however, there are problems of deteriorating the reliability of the battery and decreasing the charge-discharge cycle life of the battery. One cause of deterioration in the battery characteristics is considered that the rising of upper limit voltage for charging causes distortion or fatigue in the composite oxide of lithium from which lithium is deintercalated. Composite oxide of lithium such as $Li_xCoO_2$ or $Li_xNiO_2$ reduces in volume crystallographically in the process of a charging reaction during which lithium is deintercalated. In contrast, it increases in volume crystallographically in the process of a discharging reaction during which lithium is intercalated. The rising of the upper limit voltage for charging deintercalates more lithium, thereby causing further reduction in volume. Consequently, repeating charge and discharge at a higher upper limit voltage for charging causes the material to have more distortion and fatigue, thereby remarkably decreasing the charge-discharge cycle life.

As another cause, it is considered that the chemical activation of the material increases. Composite oxide of lithium such as $Li_xCoO_2$ or $Li_xNiO_2$, from which a lot of lithium is deintercalated by the rising of upper limit voltage for charging, are put in a highly oxidized state and become excellent in reaction activity. The composite oxide of lithium in this state undesirably reacts with the non-aqueous electrolyte in the battery. Particularly, when the battery is stored at temperatures higher than room temperature, the reaction between the positive electrode active material and the non-aqueous electrolyte deteriorates the battery capacity. In addition, the gas generated by this reaction fills the battery, increasing the internal pressure of the battery and facilitating the deformation of the battery. It is also probable that a safety mechanism provided to prevent battery breakage operates, making it impossible to use the battery. Therefore, in the case where the upper limit voltage for charging is raised to obtain higher capacity, the battery cannot be in the actual use commercially without solving the aforementioned problems.

In view of these aspects, the means proposed in Japanese Unexamined Patent Publication No. 7-320785 cannot offer sufficient reliability of a battery. The inventers of the present invention have found out that the capacity decreases particularly when the battery is stored in a charged condition, and that the recovery rate of the capacity remains low even after several times of charge and discharge. The inventers of the present invention have also found out that the means proposed in Japanese Unexamined Patent Publication No. 7-335262 deteriorates the charge-discharge cycle life. The positive electrode active materials used in these suggestions are composite oxides of lithium, nickel, and cobalt having different composition ratios. When a carbon material mixture containing a graphite material or graphite is used as the negative electrode active material together with either one of the positive electrode active materials, the charge-discharge cycle life is improved, but it is impossible to obtain sufficient storage recovery characteristics. On the other hand, when a hard carbon material is used as the negative electrode active material together with either one of the positive electrode active materials, the storage recovery characteristics are improved, but the charge-discharge cycle life is insufficient. Therefore, it is hard to obtain high reliability and long life at the same time with these positive electrode active materials.

The means proposed in Japanese Unexamined Patent Publication No. 2001-68168 cannot offer sufficient reliability of the battery, either. The inventers of the present invention have found out that the capacity remarkably decreases when it is stored in a charged state. It is also difficult to obtain high reliability and long life at the same time by using the positive electrode active material $Li_wM_vCo_xQ_{1-v-x}O_2$ (wherein M is at least one kind selected from Ge, Ti, Zr, Y, and Si; Q is at least one kind selected from Ni and Fe; and w, v, and x satisfy $0 \leq w \leq 1.2$, $0.01 \leq v \leq 0.2$, and $0.7 \leq x \leq 0.95$, respectively).

Hence, the present invention has an object to provide a non-aqueous electrolyte secondary with high capacity, high reliability, and long life by properly setting the composition of a composite oxide of lithium which is a positive electrode active material and the charging conditions of the battery using this composite oxide of lithium as a positive electrode active material. The present invention has another object to provide a charging method capable of obtaining a non-aqueous electrolyte secondary battery with high reliability and long life in addition to high capacity, when a specific composite oxide of lithium is used as a positive electrode active material.

BRIEF SUMMARY OF THE INVENTION

A non-aqueous electrolyte secondary battery of the present invention comprising a negative electrode including a negative electrode active material, a positive electrode including a positive electrode active material, and a non-aqueous electrolyte is characterized in that; the positive electrode active material is $LiNi_{1-y-z}Mn_yCo_zO_2$, wherein y and z satisfy $0 < y \leq 0.5$, $0 \leq z \leq 0.5$, and $0 < y+z \leq 0.75$; and an upper limit voltage for charging the non-aqueous electrolyte secondary battery is 4.25 to 4.70 V.

It is preferable that the negative electrode active material is graphite; the non-aqueous electrolyte comprises a mixture solvent containing ethylene carbonate and ethyl methyl carbonate, and a salt comprising $LiPF_6$; the positive electrode active material is $LiNi_{1-y-z}Mn_yCo_zO_2$, wherein y and z satisfy $0.25 \leq y \leq 0.5$, $0.25 \leq z \leq 0.5$, and $0 < y+z \leq 0.75$; and the upper limit voltage is 4.30 to 4.50 V.

A first method for charging a non-aqueous electrolyte secondary battery comprises:

(1) a first step of charging a non-aqueous electrolyte secondary battery at a constant current until the battery voltage reaches an upper limit voltage of 4.25 to 4.70 V, said non-aqueous electrolyte secondary battery comprising a negative electrode including a negative electrode active material, a positive electrode including $LiNi_{1-y-z}Mn_yCo_zO_2$, wherein y and z satisfy $0 < y \leq 0.5$, $0 \leq z \leq 0.5$, and $0 < y+z \leq 0.75$, as a positive electrode active material, and a non-aqueous electrolyte, and (2) a second step of charging the non-aqueous electrolyte secondary battery at a constant voltage of the upper limit voltage, following the first step (1).

It is preferable that the negative electrode active material is graphite; the non-aqueous electrolyte comprises a mixture solvent containing ethylene carbonate and ethyl methyl carbonate, and a salt comprising $LiPF_6$; the positive electrode active material is $LiNi_{1-y-z}Mn_yCo_zO_2$, wherein y and z satisfy $0.25 \leq y \leq 0.5$, $0.25 \leq z \leq 0.5$, and $0 < y+z \leq 0.75$; and the upper limit voltage is 4.30 to 4.50 V.

A second method for charging a non-aqueous electrolyte secondary battery comprises:

(1) a first step of charging a non-aqueous electrolyte secondary battery at a constant current until the battery voltage reaches an upper limit voltage of 4.25 to 4.70 V, the non-aqueous electrolyte secondary battery comprising a negative electrode including a negative electrode active material, a positive electrode including $LiNi_{1-y-z}Mn_yCo_zO_2$, wherein y and z satisfy the conditions of $0 < y \leq 0.5$, $0 \leq z \leq 0.5$, and $0 < y+z \leq 0.75$, as a positive electrode active material, and a non-aqueous electrolyte, and (2) a second step of pulse charging the non-aqueous electrolyte secondary battery below the upper limit voltage, following the first step (1).

It is preferable that the negative electrode active material is graphite; the non-aqueous electrolyte comprises a mixture solvent containing ethylene carbonate and ethyl methyl carbonate, and a salt comprising $LiPF_6$; the positive electrode active material is $LiNi_{1-y-z}Mn_yCo_zO_2$, wherein y and z satisfy $0.25 \leq y \leq 0.5$, $0.25 \leq z \leq 0.5$, and $0 < y+z \leq 0.75$; and the upper limit voltage is 4.30 to 4.50 V.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEW OF THE DRAWING

FIG. 3 is a diagram showing the relation between the initial discharge capacity and the storage capacity maintenance ratio in the case of charging batteries by the constant-current charge manner.

DETAILED DESCRIPTION OF THE INVENTION

Figure 1:
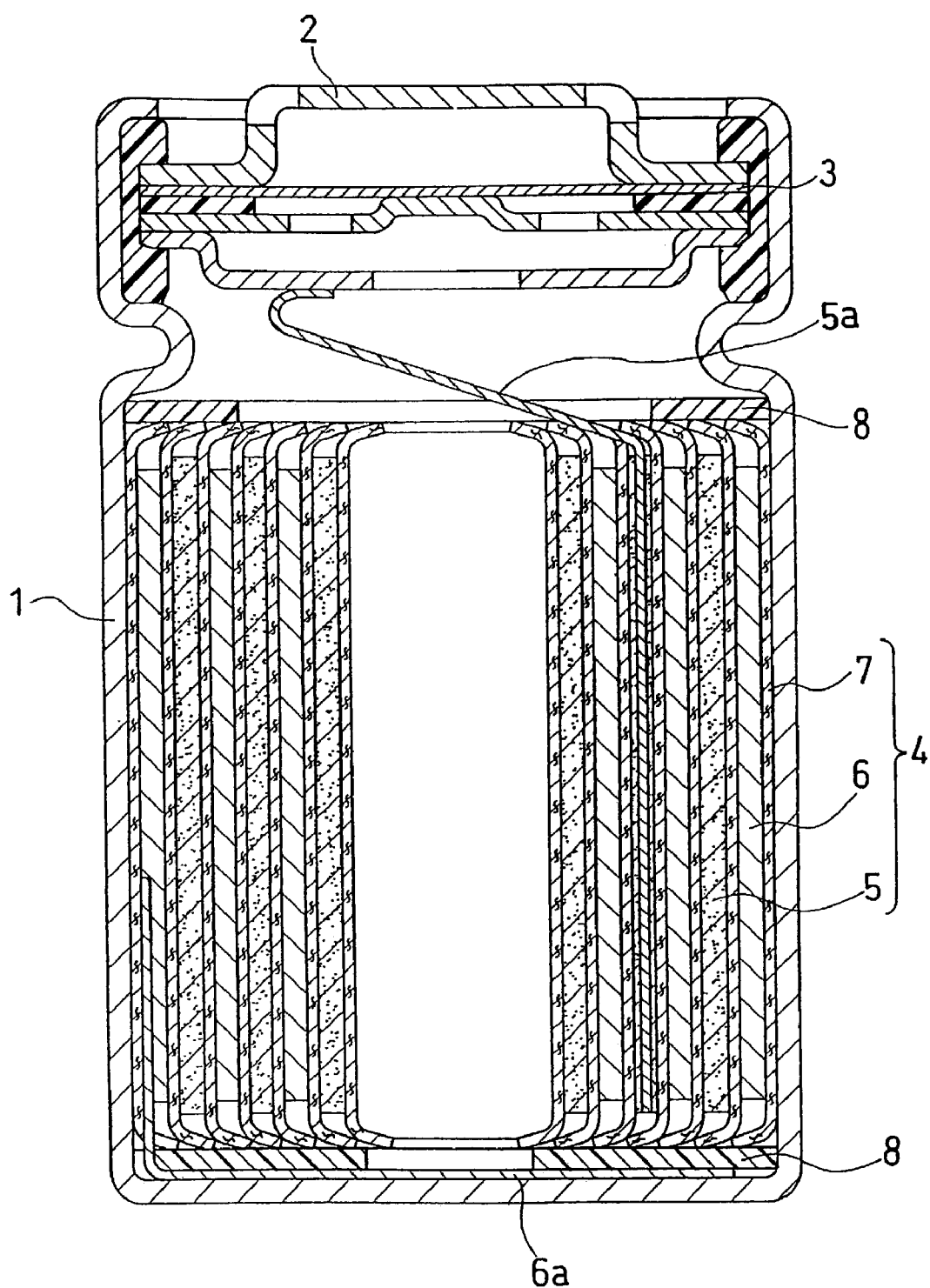
FIG. 1 is a schematic vertical cross sectional view of the cylindrical battery of an example of the present invention.

A non-aqueous electrolyte secondary battery of the present invention comprising a negative electrode including a negative electrode active material, a positive electrode including a positive electrode active material, and a non-aqueous electrolyte is characterized in that; the positive electrode active material is $LiNi_{1-y-z}Mn_yCo_zO_2$, wherein y and z satisfy $0<y\leq0.5$, $0\leq z\leq0.5$, and $0<y+z\leq0.75$; and an upper limit voltage for charging the non-aqueous electrolyte secondary battery is 4.25 to 4.70 V.

By properly setting the composition of a composite oxide of lithium which is used as a positive electrode active material and an upper limit voltage for charging a battery using this composite oxide of lithium as a positive electrode active material, it becomes possible to obtain a non-aqueous electrolyte secondary battery with high reliability and long life in addition to high capacity. However, a detailed chemical action is unknown at this point in time.

It is preferable that the negative electrode active material is graphite; the non-aqueous electrolyte comprises a mixture solvent containing ethylene carbonate and ethyl methyl carbonate, and a salt comprising $LiPF_6$; the positive electrode active material is $LiNi_{1-y-z}Mn_yCo_zO_2$, wherein y and z satisfy $0.25\leq y\leq0.5$, $0.25\leq z\leq0.5$, and $0<y+z\leq0.75$; and the upper limit voltage is 4.30 to 4.50 V.

Also, method for charging of the present invention is characterized by employing the following constant-current and constant-voltage charge manner or constant-current and pulse charge manner as a charging method for a non-aqueous electrolyte secondary battery which uses as a positive electrode active material a composite oxide of lithium, $LiNi_{1-y-z}Mn_yCo_zO_2$, wherein y and z satisfy $0<y\leq0.5$, $0\leq z\leq0.5$, and $0<y+z\leq0.75$. This enables to obtain a non-aqueous electrolyte secondary battery having high reliability and long life in addition to high capacity.

A first method for charging a non-aqueous electrolyte secondary battery of the present invention is constant-current and constant-voltage charge manner, comprising:

(1) a first step of charging a non-aqueous electrolyte secondary battery at a constant current until the battery voltage reaches an upper limit voltage of 4.25 to 4.70 V, said non-aqueous electrolyte secondary battery comprising a negative electrode including a negative electrode active material, a positive electrode including $LiNi_{1-y-z}Mn_yCo_zO_2$, wherein y and z satisfy $0<y\leq0.5$, $0\leq z\leq0.5$, and $0<y+z\leq0.75$, as a positive electrode active material, and a non-aqueous electrolyte, and (2) a second step of charging the non-aqueous electrolyte secondary battery at a constant voltage of the upper limit voltage, following the first step (1).

It is preferable that the negative electrode active material is graphite; the non-aqueous electrolyte comprises a mixture solvent containing ethylene carbonate and ethyl methyl carbonate, and a salt comprising $LiPF_6$; the positive electrode active material is $LiNi_{1-y-z}Mn_yCo_zO_2$, wherein y and z satisfy $0.25\leq y\leq0.5$, $0.25\leq z\leq0.5$, and $0<y+z\leq0.75$; and the upper limit voltage is 4.30 to 4.50 V.

A second method for charging a non-aqueous electrolyte secondary battery of the present invention is a constant-current and pulse charge manner comprising:

(1) a first step of charging a non-aqueous electrolyte secondary battery at a constant current until the battery voltage reaches an upper limit voltage of 4.25 to 4.70 V, the non-aqueous electrolyte secondary battery comprising a negative electrode including a negative electrode active material, a positive electrode including $LiNi_{1-y-z}Mn_yCo_zO_2$, wherein y and z satisfy $0<y\leq0.5$, $0\leq z\leq0.5$, and $0<y+z\leq0.75$, as a positive electrode active material, and a non-aqueous electrolyte, and (2) a second step of pulse charging the non-aqueous electrolyte secondary battery below the upper limit voltage, following the first step (1).

It is preferable that the negative electrode active material is graphite; the non-aqueous electrolyte comprises a mixture solvent containing ethylene carbonate and ethyl methyl carbonate, and a salt comprising $LiPF_6$; the positive electrode active material is $LiNi_{1-y-z}Mn_yCo_zO_2$, wherein y and z satisfy $0.25\leq y\leq0.5$, $0.25\leq z\leq0.5$, and $0<y+z\leq0.75$; and the upper limit voltage is 4.30 to 4.50 V.

Since the crystalline structure of a composite oxide of lithium, $LiNi_{1-y-z}Mn_yCo_zO_2$ loses its uniformly layered structure when the value of y in terms of the Mn content exceeds 0.5, the Mn content is set at the range of $0<y\leq0.5$. The layered structure indicates a structure where each of lithium, oxygen, and a transition metal composing a composite oxide of lithium form a single layer, and a lithium layer and a transition metal layer are laid alternately between oxygen layers.

In terms of the Co content, when the value of z exceeds 0.5, the cycle-life characteristics is deteriorated. And, in terms of the Ni content, when the value of $(1-y-z)$ is less than 0.25, in other words, the value of $(y+z)$ exceeds 0.75, the cycle-life characteristics is deteriorated.

The composite oxide of lithium, $LiNi_{1-y-z}Mn_yCo_zO_2$ wherein y and z satisfy $0<y\leq0.5$, $0\leq z\leq0.5$, and $0<y+z\leq0.75$, which is a positive electrode active material used in the present invention is obtained by mixing, sintering, and synthesizing in oxidized atmosphere, raw material compounds corresponding to the composition ratio of the metallic elements composing the active material.

As the raw material compounds, used can be oxide, hydroxide, oxyhydroxide, carbonate, nitrate, or organic complex salt of each of the metallic elements composing the active material, and these materials may be used singly or in combination of two or more of them. In order to facilitate the synthesis of a composite oxide of lithium, it is preferable to use a solid solution of oxide, hydroxide, oxyhydroxide, carbonate, nitrate, or organic complex salt of each of the metallic elements composing the active material.

The oxidizing atmosphere and sintering temperature in synthesizing a composite oxide of lithium depend on the composition, the synthesizing amount and the synthesizing device, and are preferably determined by considering them. Ideally, this composite oxide of lithium should have a single phase; however, it is possible to use as a composite oxide of lithium a multi-phase mixture containing other phases in minor amounts obtained in an industrial mass production. It does not matter to contain other elements as impurities within the amounts which are usually contained in industrial raw materials.

The average particle diameter of the positive electrode active material is not particularly restricted, but preferably 1 to 30 µm.

The non-aqueous electrolyte secondary battery of the present invention comprises a positive electrode using the above-mentioned positive electrode active material, a negative electrode using a negative electrode active material, and a non-aqueous electrolyte.

The above-mentioned positive electrode can be obtained, for example, by applying a positive electrode mixture, which is obtained by mixing the positive electrode active material, a conductive material, a binder and the like, onto the surface of a current collector.

The conductive material for positive electrode may be an electronically conductive material which is substantially chemically stable in an assembled battery. For example, used can be graphite such as natural graphite (scale-shaped graphite or the like) or artificial graphite; carbon black such as acetylene black, ketjen black, channel black, furnace black, lamp black, or thermal black; conductive fiber such as carbon fiber or metal fiber; metallic powder such as carbon fluoride or aluminum; conductive whisker such as zinc oxide or potassium titanate; conductive metal oxide such as titanium oxide; or an organic conductive material such as polyphenylene derivative, and these can be used singly or in combination. Of these conductive materials, artificial graphite and acetylene black are particularly preferable. Although the amount of a conductive material to be added is not particularly restricted, it is preferably 1 to 50 wt %, and more preferably 1 to 30 wt % to 100 wt % of positive electrode active material. In the case of carbon or graphite, it is more preferably 2 to 15 wt %.

As the binder for positive electrode, thermoplastic resin, thermosetting resin, or the like can be used. For example, used can be polyethylene, polypropylene, polytetrafluoroethylene (PTFE), polyvinylidene fluoride (PVDF), styrene butadiene rubber, tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylate copolymer or ($Na^+$) ion cross-linked material thereof, ethylene-methacrylate copolymer or ($Na^+$) ion cross-linked material thereof, ethylene-methylacrylate copolymer or ($Na^+$) ion cross-linked material thereof, or ethylene-methylmethacrylate copolymer or ($Na^+$) ion cross-linked material thereof, and these can be used singly or in combination. Of these materials, polyvinylidene fluoride (PVDF) and polytetrafluoroethylene (PTFE) are particularly preferable.

The current collector for positive electrode may be an electronically conductive member which is substantially chemically stable in an assembled battery. For example, as the current collector, aluminum, stainless steel, nickel, titanium, carbon, or conductive resin can be used. Besides them, it is also possible to use a composite material obtained by processing the surface of aluminum or stainless steel with carbon or titanium. Of all, aluminum and aluminum alloy are particularly preferable. These materials may be used after oxidizing their surfaces. The surface of the current collector is preferably made rough to have concave portions and convex portions by applying a surface treatment.

The current collector can be in the form of foil, film, sheet, net, punched member, lath member, porous member, foam, or molded article of fibers. Its thickness is not particularly restricted, but preferably 1 to 500 μm.

The above-mentioned negative electrode can be obtained by applying a negative electrode mixture which is obtained by mixing a negative electrode active material containing a graphite material, a hard carbon material, or a lithium alloy, a conductive material, a binder and the like, onto the surface of the current collector.

The lithium alloy preferably comprises lithium and at least one element selected from the group consisting of silicon, tin, aluminum, zinc, and magnesium. The average particle diameter of the negative electrode active material is not particularly restricted, but preferably 1 to 30 μm.

The conductive material for negative electrode may be any electronically conductive material. For example, used can be graphite such as natural graphite (scale-shaped graphite or the like), artificial graphite, or flexible graphite; carbon black such as acetylene black, ketjen black, channel black, furnace black, lamp black, or thermal black; conductive fiber such as carbon fiber or metal fiber; metallic powder such as copper or nickel; or an organic conductive material such as polyphenylene derivative, and these can be used singly or in combination. Of these conductive materials, artificial graphite, acetylene black, and carbon fiber are particularly preferable. Although the amount of a conductive material to be added is not particularly restricted, it is preferably 1 to 30 wt %, and more preferably 1 to 10 wt % to 100 wt % of negative electrode active material.

As the binder for negative electrode, thermoplastic resin, thermosetting resin, or the like can be used. For example, used can be polyethylene, polypropylene, polytetrafluoroethylene (PTFE), polyvinylidene fluoride (PVDF), styrene butadiene rubber, tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylate copolymer or ($Na^+$) ion cross-linked material thereof, ethylene-methacrylate copolymer or ($Na^+$) ion cross-linked material thereof, ethylene-methylacrylate copolymer or ($Na^+$) ion cross-linked material thereof, or ethylene-methylmethacrylate copolymer or ($Na^+$) ion cross-linked material thereof, and these can be used singly or in combination. Particularly preferable among these materials are styrene butadiene rubber, polyvinylidene fluoride, ethylene-acrylate copolymer or ($Na^+$) ion cross-linked material thereof, ethylene-methacrylate copolymer or ($Na^+$) ion cross-linked material thereof, ethylene-methylacrylate copolymer or ($Na^+$) ion cross-linked material thereof, and ethylene-methylmethacrylate copolymer or ($Na^+$) ion cross-linked material thereof.

The current collector for negative electrode may be an electronically conductive member which is substantially chemically stable in an assembled battery. For example, as the current collector, stainless steel, nickel, copper, titanium, carbon, or conductive resin can be used. Besides them, it is also possible to use a composite material obtained by processing the surface of copper or stainless steel with carbon, nickel, or titanium. Of all, copper and copper alloy are particularly preferable. These materials may be used after oxidizing their surfaces. The surface of the current collector is preferably made rough to have concave portions and convex portions by applying a surface treatment.

The current collector can be in the form of foil, film, sheet, net, punched member, lath member, porous member, foam, or molded article of fibers. Its thickness is not particularly restricted, but preferably 1 to 500 μm.

The positive electrode mixture and the negative electrode mixture can comprise a filler, a dispersing agent, an ion conductor, a pressure builder, and other various kinds of additives besides a conductive material and a binder.

The filler may be a fibrous material chemically stable in an assembled battery. Olefin-type polymer such as polypropylene or polyethylene, glass, or fiber such as carbon is usually used. Although the amount of a filler to be added is not particularly restricted, it is preferably 0 to 10 wt % of positive electrode mixture or negative electrode mixture.

The positive electrode and the negative electrode are preferably disposed oppositely so that at least the negative electrode mixture side faces the positive electrode mixture side.

The non-aqueous electrolyte comprises a solvent and a lithium salt dissolved in the solvent.

As the solvent, for example, used can be cyclic carbonate such as ethylene carbonate (EC), propylene carbonate (PC), butylene carbonate (BC), or vinylene carbonate (VC); chain carbonate such as dimethyl carbonate (DMC), diethyl carbonate (DEC), ethylmethyl carbonate (EMC), dipropyl carbonate(DPC); aliphatic carboxylic acid ester such as methyl formate, methyl acetate, methyl propionate, or ethyl propionate; γ-lactone such as γ-butyrolactone; chain ester such as 1,2-dimethoxy ethane (DME), 1,2-diethoxy ethane (DEE), or ethoxymethoxy ethane (EME); cyclic ether such as tetrahydrofuran or 2-methyltetrahydrofuran; non proton organic solvent such as dimethyl sulfoxide, 1,3-dioxolane, formamide, acetamide, dimethylformamide, dioxolane, acetonitrile, propylnitrile, nitromethane, ethyl monoglyme, phosphate triester, trimethoxy methane, dioxolane derivative, sulfolane, methyl sulfolane, 1,3-dimethyl-2-imidazolidinone, 3-methyl-2-oxazolidinone, propylene carbonate derivative, tetrahydrofuran derivative, ethyl ether, 1,3-propanesultone, anisole, dimethyl sulfoxide, or N-methylpyrrolidone, and these can be used singly or in combination of two or more of them. Particularly preferable among them are a mixture of cyclic carbonate and chain carbonate, and a mixture of cyclic carbonate, chain carbonate, and aliphatic carboxylic acid ester.

As the above-mentioned lithium salt, used can be $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic carboxylic acid lithium, LiCl, LiBr, LiI, chloroborane lithium, triphenyl lithiumborate, or imide, and these can be used singly or in combination of two or more of them. Of these, $LiPF_6$ is particularly preferable.

The above-mentioned non-aqueous electrolyte preferably comprises a solvent containing at least ethylene carbonate and ethylmethyl carbonate, and $LiPF_6$ as a supporting salt dissolved in the solvent. Although the additive amount of the non-aqueous electrolyte is not particularly restricted, the amount to need may be used in accordance with the amount of the positive electrode active material and the negative electrode active material and the battery size. The amount of the salt to be dissolved in the solvent is not particularly restricted, but is preferably 0.2 to 2 mol/l. And it is more preferably 0.5 to 1.5 mol/l.

It is effective to add another compound to the above-mentioned electrolyte for the purpose of improving discharge properties and charge-discharge cycle properties. As the compound, for example, triethylphosphate, triethanolamine, cyclic ether, ethylenediamine, n-glyme, pyridine, hexaphosphate triamide, nitrobenzene derivative, crown ether, quaternary ammonium salt, or ethylene glycol dialkylether can be used.

Between the positive electrode and the negative electrode is disposed a separator containing the non-aqueous electrolyte.

As the separator, an insulating fine porous thin film having high ion permeability and predetermined mechanical strength can be used. It is preferable that the separator has the function to close pores when the predetermined temperature is reached so as to increase resistance. Used can be sheet, unwoven cloth, or woven cloth made of olefin-type polymer such as polypropylene or polyethylene, which has chemical resistance to an organic solvent and hydrophobicity, or from glass fiber. The pore diameter of the separator is preferably in the range that does not cause the permeation of the positive or negative electrode active material, conductive material, and binder dissociated from the positive or negative electrode, which is preferably 0.01 to 1 μm. The thickness of the separator is generally set at 10 to 300 μm. The porosity, which is determined according to the permeability of electrons and ions, the material, and the film thickness, is preferably 30 to 80% in general.

It is possible to assemble a battery in such a manner that the positive electrode mixture and the negative electrode mixture contain a polymer material holding a non-aqueous electrolyte, and that the positive electrode and the negative electrode are integrated with a porous separator made from the polymer material holding the non-aqueous electrolyte. The polymer material may be able to absorb and hold a non-aqueous electrolyte, and a vinylidene fluoride-hexafluoropropylene copolymer is particularly preferable.

The non-aqueous electrolyte secondary battery of the present invention can be designed to be coin-shaped, button-shaped, sheet-shaped, laminated, cylindrical, flat, square, or large-scale used in electric cars and the like. And, the non-aqueous electrolyte secondary battery of the present invention can be used in portable information terminals, portable electronic devices, domestic small-sized power storage devices, automatic bicycles, electric cars, and hybrid electric cars, but is not particularly restricted to these.

The present invention will be described in more detail through examples as follows. However, the present invention is not restricted to these examples.

EXAMPLE AND COMPARATIVE EXAMPLE (i) Preparation of a positive electrode

As positive electrode active materials, composite oxides of lithium having the respective compositions shown in Table 1 (active materials 1-17 belong to the example and active materials 18-20 belong to the comparative example) were prepared in the following method.

TABLE 1

|  | Positive electrode active material |
| --- | --- |
| Active material 1 | $LiNi_{0.99}Mn_{0.01}O_2$ |
| Active material 2 | $LiNi_{0.90}Mn_{0.10}O_2$ |
| Active material 3 | $LiNi_{0.80}Mn_{0.20}O_2$ |
| Active material 4 | $LiNi_{0.70}Mn_{0.30}O_2$ |
| Active material 5 | $LiNi_{0.60}Mn_{0.40}O_2$ |
| Active material 6 | $LiNi_{0.50}Mn_{0.50}O_2$ |
| Active material 7 | $LiNi_{0.98}Mn_{0.01}Co_{0.01}O_2$ |
| Active material 8 | $LiNi_{0.80}Mn_{0.10}Co_{0.10}O_2$ |
| Active material 9 | $LiNi_{0.60}Mn_{0.20}Co_{0.20}O_2$ |
| Active material 10 | $LiNi_{0.40}Mn_{0.30}Co_{0.30}O_2$ |
| Active material 11 | $LiNi_{0.49}Mn_{0.49}Co_{0.02}O_2$ |
| Active material 12 | $LiNi_{0.45}Mn_{0.45}Co_{0.10}O_2$ |
| Active material 13 | $LiNi_{0.40}Mn_{0.40}Co_{0.20}O_2$ |
| Active material 14 | $LiNi_{0.35}Mn_{0.35}Co_{0.30}O_2$ |
| Active material 15 | $LiNi_{0.30}Mn_{0.30}Co_{0.40}O_2$ |
| Active material 16 | $LiNi_{0.25}Mn_{0.25}Co_{0.50}O_2$ |
| Active material 17 | $LiNi_{0.25}Mn_{0.50}Co_{0.25}O_2$ |
| Active material 18 (comparative) | $LiNiO_2$ |
| Active material 19 (comparative) | $LiNi_{0.50}Co_{0.50}O_2$ |
| Active material 20 (comparative) | $LiCoO_2$ |

Alkali hydroxide was added to sulfate containing the metallic elements besides lithium in the predetermined composition ratio, which composed the active material, so as to produce a precipitate. Then, the precipitate was well rinsed with water and dried to obtain a co-precipitated hydroxide. Lithium hydroxide was added to the co-precipitated hydroxide and fully mixed, and then sintered in an oxidizing atmosphere at a predetermined synthesis temperature so as to obtain a composite oxide of lithium.

The oxygen partial pressure in the oxidizing atmosphere was 0.19 to 1 atmospheric pressure, the synthesis temperature was 600 to 1000° C., and the synthesis time was 6 to 48 hours. The oxygen partial pressure, synthesis temperature, and synthesis time in the oxidizing atmosphere were determined by finding the appropriate conditions according to the composition of the composite oxide of lithium to be obtained.

The raw material compounds were synthesized by combining the oxide, hydroxide, oxyhydroxide, carbonate, nitrate, and organic complex salt of the metallic elements composing the active material, and were evaluated. In the present example, lithium hydroxide and co-precipitate hydroxide containing the metallic elements other than lithium composing the active material were used for simplification.

The composite oxide of lithium powder obtained above as an active material, carbon powder as a conductive material, and polyvinylidene fluoride resin as a binder were mixed in a weight ratio of 85:10:5. This mixture was dispersed in dehydrated N-methylpyrrolidinone, and polyvinylidene fluoride resin was dissolved therein so as to obtain slurried positive electrode mixture. Then, this positive electrode mixture was applied on the positive electrode current collector made of aluminum foil, dried, and rolled out to prepare a positive electrode 5.

(ii) Preparation of a negative electrode

When the negative electrode active material is composed of a graphite material or a hard carbon material, the negative electrode was prepared as follows.

Aretificial graphite (MAG-D, manufactured by Hitachi Chemical Co., Ltd.) as a graphite material or CARBOTRON P (manufactured by Kureha Chemical Industry Co., Ltd.) as a hard carbon material, and polyvinylidene fluoride resin as a binder were mixed in a weight ratio of 95:5. After this mixture was dispersed in dehydrated N-methylpyrrolidinone, polyvinylidene fluoride resin was dissolved therein to prepare slurried negative electrode mixture. This negative electrode mixture was applied on the negative electrode current collector made from copper foil, dried, and rolled out to prepare a negative electrode 6.

When the negative electrode active material is composed of lithium alloy, the negative electrode was prepared as follows.

Li—Al alloy ($Li_{0.3}Al_{0.7}$) as a lithium alloy, carbon powder as a conductive material, and polyvinylidene fluoride resin as a binder were mixed in a weight ratio of 75:20:5. After this mixture was dispersed in dehydrated N-methylpyrrolidinone, polyvinylidene fluoride resin was dissolved therein to prepare slurried negative electrode mixture. This negative electrode mixture was applied on the negative electrode current collector made of copper foil, dried, and rolled out to prepare a negative electrode 6.

(iii) Preparation of a battery

FIG. 1 show a schematic vertical cross sectional view of the cylindrical battery of the present invention.

The positive electrode 5 and the negative electrode 6 obtained above were rolled up with a separator 7 disposed therebetween for several number of times so as to form an electrode assembly 4. Insulating rings 8 were disposed on the top and the bottom of the electrode assembly 4, respectively. The positive electrode lead 5a from the positive electrode 5 was connected with a sealing plate 2. The negative electrode lead 6a from the negative electrode 6 was connected to the bottom of the battery case 1. The electrode assembly 4 was accommodated in a battery case 1, and an electrolyte was poured in the battery case 1. In this case, as an electrolyte, a mixture solvent comprising the mixture of ethylene carbonate and ethyl methyl carbonate in a volumetric ratio of 1:1 where 1. 5 mol/l of $LiPF_6$ was dissolved was used. After the electrolyte was poured, an insulating packing 3 was disposed, and the battery case 1 was sealed with a sealing plate 2. Thus, a cylindrical battery which was 18 mm in diameter and 65 mm in height was prepared.

Metal or alloy having electronic conductivity and chemical resistance to organic electrolyte can be used for the above-mentioned battery case 1, the positive electrode lead 5a, and the negative electrode lead 6a. For example, metals such as iron, nickel, titanium, chrome, molybdenum, copper, and aluminum, and alloy containing these metals can be used. In particular, it is preferable to use stainless steel or an Al—Mn alloy plate as the battery case 1. It is preferable to use aluminum as the positive electrode lead 5a and to use nickel as the negative electrode lead 6a. For weight reduction, the battery case 1 may be composed of various kinds of engineering plastics or a combination with metal.

In the sealing plate 2, a safety valve may be provided. In place of a safety valve, various kinds of safety devices or elements conventionally known may be provided. For example, fuse, bimetal, PTC device can be used as an over-current protective element. As measures against an increase in the inner pressure of the battery case 1 besides a safety valve, it is possible to make a cut in the battery case 1, to make a crack in the gasket, to make a crack in the sealing plate 2, and to cut the positive electrode lead 5a and the negative electrode lead 6a respectively. The charger can be provided with a protection circuit having measures against overcharging and overdischarging or can be connected with an independent protection circuit.

As measures against overcharging, it is possible to provide a manner for interrupting a current in response to an increase in a battery internal pressure. In this case, a compound to increase the internal pressure is contained in the positive electrode mixture, negative electrode mixture, or non-aqueous electrolyte. Carbonate such as $Li_2CO_3$, $LiHCO_3$, $Na_2CO_3$, $NaHCO_3$, $CaCO_3$, or $MgCO_3$ can be used as the compound to increase the internal pressure.

The well-known methods (for example, electric welding of direct current or alternating current, laser welding, or ultrasonic welding) can be used as a method for welding the battery case 1, the positive electrode lead 5a, negative electrode lead 6a, and sealing plate 2.

As a sealing agent, compounds or mixtures conventionally known such as asphalt can be used.

Thus, as shown in Table 2 various kinds of positive electrode active materials and various kinds of negative electrode active materials were combined to prepare batteries 1-28 (batteries 1-19 belong to the example and batteries 20-28 belong to the comparative example).

TABLE 2

| | Positive electrode active material | Negative electrode active material |
|---|---|---|
| Battery 1 | $LiNi_{0.99}Mn_{0.01}O_2$ | Graphite |
| Battery 2 | $LiNi_{0.90}Mn_{0.10}O_2$ | Graphite |
| Battery 3 | $LiNi_{0.80}Mn_{0.20}O_2$ | Graphite |
| Battery 4 | $LiNi_{0.70}Mn_{0.30}O_2$ | Graphite |
| Battery 5 | $LiNi_{0.60}Mn_{0.40}O_2$ | Graphite |
| Battery 6 | $LiNi_{0.50}Mn_{0.50}O_2$ | Graphite |
| Battery 7 | $LiNi_{0.98}Mn_{0.01}Co_{0.01}O_2$ | Graphite |

TABLE 2-continued

| | Positive electrode active material | Negative electrode active material |
|---|---|---|
| Battery 8 | $LiNi_{0.80}Mn_{0.10}Co_{0.10}O_2$ | Graphite |
| Battery 9 | $LiNi_{0.60}Mn_{0.20}Co_{0.20}O_2$ | Graphite |
| Battery 10 | $LiNi_{0.40}Mn_{0.30}Co_{0.30}O_2$ | Graphite |
| Battery 11 | $LiNi_{0.49}Mn_{0.49}Co_{0.02}O_2$ | Graphite |
| Battery 12 | $LiNi_{0.45}Mn_{0.45}Co_{0.10}O_2$ | Graphite |
| Battery 13 | $LiNi_{0.40}Mn_{0.40}Co_{0.20}O_2$ | Graphite |
| Battery 14 | $LiNi_{0.35}Mn_{0.35}Co_{0.30}O_2$ | Graphite |
| Battery 15 | $LiNi_{0.30}Mn_{0.30}Co_{0.40}O_2$ | Graphite |
| Battery 16 | $LiNi_{0.25}Mn_{0.25}Co_{0.50}O_2$ | Graphite |
| Battery 17 | $LiNi_{0.25}Mn_{0.50}Co_{0.25}O_2$ | Graphite |
| Battery 18 | $LiNi_{0.40}Mn_{0.40}Co_{0.20}O_2$ | Hard carbon |
| Battery 19 | $LiNi_{0.40}Mn_{0.40}Co_{0.20}O_2$ | Li—Al alloy |
| Battery 20 (comparative) | $LiNiO_2$ | Graphite |
| Battery 21 (comparative) | $LiNiO_2$ | Hard carbon |
| Battery 22 (comparative) | $LiNiO_2$ | Li—Al alloy |
| Battery 23 (comparative) | $LiNi_{0.50}Co_{0.50}O_2$ | Graphite |
| Battery 24 (comparative) | $LiNi_{0.50}Co_{0.50}O_2$ | Hard carbon |
| Battery 25 (comparative) | $LiNi_{0.50}Co_{0.50}O_2$ | Li—Al alloy |
| Battery 26 (comparative) | $LiCoO_2$ | Graphite |
| Battery 27 (comparative) | $LiCoO_2$ | Hard carbon |
| Battery 28 (comparative) | $LiCoO_2$ | Li—Al alloy |

With respect to each of the batteries 1-28, the following cycle life properties and storage properties were evaluated under the charging conditions of the conditions 1-24 shown in Table 3 (the conditions 2-7, 10-15, 18-23 belong to the example, and the conditions 1, 8, 9, 16, 17, and 24 belong to the comparative example).

TABLE 3

| | Charging manner | Upper limit voltage (V) |
|---|---|---|
| Condition 1 (comparative) | Constant-current charge | 4.2 |
| Condition 2 | | 4.25 |
| Condition 3 | | 4.3 |
| Condition 4 | | 4.4 |
| Condition 5 | | 4.5 |
| Condition 6 | | 4.6 |
| Condition 7 | | 4.7 |
| Condition 8 (comparative) | | 4.8 |
| Condition 9 (comparative) | Constant-current and constant-voltage charge | 4.2 |
| Condition 10 | | 4.25 |
| Condition 11 | | 4.3 |
| Condition 12 | | 4.4 |
| Condition 13 | | 4.5 |
| Condition 14 | | 4.6 |
| Condition 15 | | 4.7 |
| Condition 16 (comparative) | | 4.8 |
| Condition 17 (comparative) | Constant-current and pulse charge | 4.2 |
| Condition 18 | | 4.25 |
| Condition 19 | | 4.3 |
| Condition 20 | | 4.4 |
| Condition 21 | | 4.5 |
| Condition 22 | | 4.6 |
| Condition 23 | | 4.7 |
| Condition 24 (comparative) | | 4.8 |

EVALUATIONS

After being charged under the charging conditions shown in Table 3, the batteries were discharged until 2.5 V at a constant current of 400 mA, and discharge capacities at that time were measured. This charging and discharging was conducted in a constant temperature chamber of 20° C. This charging and discharging was repeated up to 300 cycles, and the discharge capacities in the 300th cycle were measured. The ratio of the discharge capacity in the 300th cycle to the initial discharge capacity was obtained as a cycle capacity maintenance ratio.

Apart from this, the batteries which undergone the charging in the 5th cycle in the charge-discharge cycle were stored for 20 days in the constant temperature chamber of 60° C. The batteries after the storage were discharged until 2.5 V at a constant current of 400 mA, and discharge capacities at that time were measured. The ratio of the discharge capacity after the storage to the discharge capacity in the 4th cycle before the storage was obtained as a storage capacity maintenance ratio.

Each charging shown in Table 3 was performed as follows.

In the conditions 1-8, the batteries were charged by a constant-current charge manner. The charging was performed at a constant current of 400 mA until the battery voltages reached the upper limit voltages, which changed in the range of 4.25 to 4.70 V as shown in Table 3.

In the conditions 9-16, the batteries were charged by a constant-current and constant-voltage charge manner. The charging was performed at a constant current of 400 mA until the battery voltages reached the upper limit voltages, which changed in the range of 4.25 to 4.70 V as shown in Table 3. After the battery voltages reached the upper limit voltages, the charging was performed at constant voltages of the upper limit voltages, and the charging was terminated when the charge current diminished to 50 mA.

In the conditions 17-24, the batteries were charged by a constant-current and pulse charge manner. The charging was performed at a constant current of 400 mA until the battery voltages reached the upper limit voltages, which changed in the range of 4.25 to 4.70 V as shown in Table 3. After the battery voltages reached the upper limit voltages, the pulse charging was performed to repeat to charge and rest alternately for a preset time. And the charging was terminated when the charge current density diminished to 10 mA. During the pulse charging, the charge current was so controlled that the battery voltages kept below the limit voltages.

Table 4-9 show evaluation results obtained from the combinations of the batteries shown in Table 2 and the charging conditions shown in Table 3.

In each cell in Tables 4-9, the numbers in the top, the middle, and the bottom indicate an initial discharge capacity (mAh), a cycle capacity maintenance ratio (%), and a storage capacity maintenance ratio (%), respectively.

TABLE 4

| | Condition | | | | | | | |
|---|---|---|---|---|---|---|---|---|
| | 1 | 2 | 3 | 4 | 5 | 6 | 7 | 8 |
| Battery 1 | 1690 | 1700 | 1710 | 1730 | 1750 | 1770 | 1790 | 1750 |
| | 84 | 84 | 81 | 76 | 59 | 42 | 33 | 19 |
| | 70 | 70 | 66 | 55 | 41 | 34 | 21 | 13 |
| Battery 2 | 1680 | 1700 | 1710 | 1730 | 1750 | 1770 | 1790 | 1770 |
| | 84 | 85 | 82 | 77 | 61 | 44 | 36 | 22 |
| | 70 | 70 | 67 | 56 | 42 | 35 | 22 | 14 |
| Battery 3 | 1650 | 1670 | 1710 | 1730 | 1750 | 1770 | 1790 | 1760 |
| | 84 | 85 | 83 | 79 | 63 | 50 | 41 | 26 |
| | 70 | 70 | 68 | 58 | 45 | 40 | 28 | 20 |
| Battery 4 | 1630 | 1650 | 1690 | 1730 | 1750 | 1770 | 1790 | 1770 |
| | 84 | 85 | 83 | 80 | 65 | 56 | 47 | 22 |
| | 70 | 70 | 69 | 60 | 49 | 46 | 38 | 25 |
| Battery 5 | 1610 | 1630 | 1670 | 1720 | 1740 | 1770 | 1790 | 1750 |
| | 84 | 86 | 84 | 82 | 70 | 62 | 52 | 30 |
| | 70 | 70 | 70 | 65 | 54 | 52 | 43 | 29 |
| Battery 6 | 1590 | 1610 | 1640 | 1700 | 1740 | 1760 | 1780 | 1740 |
| | 85 | 86 | 86 | 83 | 76 | 67 | 58 | 25 |
| | 70 | 70 | 70 | 69 | 61 | 58 | 51 | 31 |

TABLE 4-continued

|  | \multicolumn{8}{c|}{Condition} |
|---|---|---|---|---|---|---|---|---|
|  | 1 | 2 | 3 | 4 | 5 | 6 | 7 | 8 |
| Battery 7 | 1690 | 1710 | 1720 | 1740 | 1750 | 1770 | 1790 | 1760 |
|  | 84 | 84 | 81 | 76 | 59 | 42 | 33 | 20 |
|  | 70 | 70 | 67 | 56 | 43 | 39 | 29 | 15 |
| Battery 8 | 1660 | 1680 | 1720 | 1740 | 1760 | 1770 | 1790 | 1760 |
|  | 84 | 85 | 83 | 79 | 64 | 51 | 41 | 23 |
|  | 70 | 70 | 67 | 57 | 43 | 40 | 30 | 15 |
| Battery 9 | 1620 | 1640 | 1680 | 1730 | 1750 | 1780 | 1790 | 1740 |
|  | 84 | 85 | 85 | 83 | 71 | 63 | 53 | 25 |
|  | 70 | 70 | 68 | 57 | 45 | 41 | 37 | 17 |
| Battery 10 | 1600 | 1620 | 1650 | 1710 | 1750 | 1770 | 1790 | 1760 |
|  | 85 | 86 | 87 | 84 | 77 | 68 | 58 | 27 |
|  | 70 | 70 | 69 | 60 | 49 | 47 | 42 | 20 |
| Battery 11 | 1590 | 1620 | 1650 | 1700 | 1740 | 1760 | 1780 | 1700 |
|  | 85 | 86 | 86 | 83 | 77 | 69 | 60 | 28 |
|  | 70 | 70 | 70 | 69 | 60 | 57 | 50 | 29 |
| Battery 12 | 1590 | 1620 | 1650 | 1700 | 1740 | 1760 | 1780 | 1710 |
|  | 85 | 86 | 86 | 84 | 77 | 70 | 60 | 28 |
|  | 70 | 70 | 70 | 70 | 61 | 59 | 52 | 20 |
| Battery 13 | 1590 | 1620 | 1650 | 1710 | 1740 | 1760 | 1780 | 1690 |
|  | 85 | 86 | 86 | 83 | 78 | 70 | 61 | 26 |
|  | 70 | 70 | 71 | 70 | 60 | 59 | 53 | 21 |
| Battery 14 | 1590 | 1620 | 1650 | 1710 | 1740 | 1760 | 1780 | 1700 |
|  | 85 | 86 | 86 | 84 | 78 | 69 | 61 | 29 |
|  | 70 | 70 | 71 | 70 | 63 | 60 | 51 | 21 |

TABLE 5

|  | \multicolumn{8}{c|}{Condition} |
|---|---|---|---|---|---|---|---|---|
|  | 1 | 2 | 3 | 4 | 5 | 6 | 7 | 8 |
| Battery 15 | 1590 | 1620 | 1650 | 1710 | 1750 | 1760 | 1780 | 1720 |
|  | 85 | 86 | 86 | 83 | 77 | 70 | 60 | 29 |
|  | 70 | 70 | 70 | 71 | 62 | 61 | 53 | 24 |
| Battery 16 | 1590 | 1620 | 1650 | 1710 | 1750 | 1760 | 1780 | 1750 |
|  | 85 | 86 | 86 | 84 | 77 | 69 | 60 | 25 |
|  | 70 | 70 | 70 | 71 | 65 | 63 | 55 | 19 |
| Battery 17 | 1590 | 1610 | 1640 | 1700 | 1740 | 1760 | 1780 | 1730 |
|  | 85 | 86 | 85 | 83 | 76 | 68 | 60 | 29 |
|  | 70 | 70 | 71 | 70 | 62 | 59 | 53 | 20 |
| Battery 18 | 1580 | 1610 | 1640 | 1700 | 1730 | 1750 | 1770 | 1710 |
|  | 86 | 87 | 87 | 85 | 80 | 72 | 63 | 31 |
|  | 68 | 68 | 69 | 67 | 59 | 57 | 51 | 18 |
| Battery 19 | 1610 | 1640 | 1670 | 1730 | 1760 | 1780 | 1800 | 1720 |
|  | 84 | 84 | 84 | 82 | 77 | 68 | 59 | 27 |
|  | 67 | 65 | 66 | 65 | 57 | 55 | 49 | 17 |
| Battery 20 | 1690 | 1700 | 1710 | 1730 | 1750 | 1770 | 1790 | 1730 |
|  | 81 | 80 | 78 | 70 | 53 | 39 | 26 | 11 |
|  | 67 | 61 | 60 | 49 | 35 | 27 | 15 | 4 |
| Battery 21 | 1580 | 1590 | 1600 | 1620 | 1640 | 1660 | 1680 | 1610 |
|  | 82 | 82 | 80 | 71 | 55 | 43 | 29 | 13 |
|  | 65 | 64 | 60 | 50 | 34 | 25 | 14 | 3 |
| Battery 22 | 1720 | 1730 | 1740 | 1760 | 1780 | 1790 | 1800 | 1750 |
|  | 78 | 73 | 70 | 53 | 38 | 22 | 10 | 2 |
|  | 65 | 50 | 48 | 35 | 28 | 20 | 10 | 0 |
| Battery 23 | 1640 | 1650 | 1660 | 1680 | 1700 | 1720 | 1730 | 1700 |
|  | 83 | 82 | 80 | 73 | 55 | 42 | 29 | 14 |
|  | 69 | 63 | 60 | 53 | 39 | 32 | 20 | 11 |
| Battery 24 | 1560 | 1570 | 1580 | 1600 | 1620 | 1640 | 1650 | 1610 |
|  | 83 | 83 | 82 | 72 | 58 | 45 | 33 | 15 |
|  | 68 | 67 | 63 | 52 | 38 | 30 | 18 | 10 |
| Battery 25 | 1670 | 1680 | 1690 | 1710 | 1730 | 1740 | 1760 | 1720 |
|  | 80 | 77 | 72 | 66 | 47 | 32 | 20 | 3 |
|  | 67 | 63 | 60 | 48 | 34 | 24 | 13 | 3 |
| Battery 26 | 1580 | 1590 | 1600 | 1620 | 1630 | 1640 | 1650 | 1600 |
|  | 84 | 83 | 80 | 74 | 57 | 40 | 30 | 15 |
|  | 70 | 69 | 65 | 54 | 41 | 33 | 21 | 12 |
| Battery 27 | 1530 | 1540 | 1550 | 1570 | 1580 | 1590 | 1600 | 1590 |
|  | 84 | 83 | 82 | 73 | 59 | 47 | 34 | 16 |
|  | 69 | 67 | 63 | 52 | 39 | 30 | 19 | 9 |

TABLE 5-continued

|  | \multicolumn{8}{c|}{Condition} |
|---|---|---|---|---|---|---|---|---|
|  | 1 | 2 | 3 | 4 | 5 | 6 | 7 | 8 |
| Battery 28 | 1600 | 1610 | 1620 | 1640 | 1650 | 1660 | 1670 | 1570 |
|  | 81 | 78 | 74 | 66 | 49 | 33 | 22 | 4 |
|  | 68 | 64 | 61 | 49 | 36 | 26 | 15 | 5 |

TABLE 6

|  | \multicolumn{8}{c|}{Condition} |
|---|---|---|---|---|---|---|---|---|
|  | 9 | 10 | 11 | 12 | 13 | 14 | 15 | 16 |
| Battery 1 | 1710 | 1720 | 1730 | 1750 | 1770 | 1790 | 1810 | 1800 |
|  | 82 | 83 | 80 | 74 | 56 | 35 | 27 | 11 |
|  | 69 | 69 | 65 | 53 | 40 | 31 | 19 | 9 |
| Battery 2 | 1700 | 1720 | 1730 | 1750 | 1770 | 1790 | 1810 | 1780 |
|  | 81 | 83 | 81 | 76 | 60 | 41 | 31 | 14 |
|  | 69 | 69 | 66 | 54 | 41 | 32 | 20 | 10 |
| Battery 3 | 1670 | 1690 | 1730 | 1750 | 1770 | 1790 | 1810 | 1730 |
|  | 82 | 82 | 81 | 77 | 61 | 48 | 40 | 19 |
|  | 69 | 69 | 67 | 57 | 45 | 38 | 27 | 15 |
| Battery 4 | 1650 | 1670 | 1710 | 1750 | 1770 | 1790 | 1810 | 1710 |
|  | 82 | 83 | 82 | 79 | 63 | 54 | 45 | 21 |
|  | 69 | 69 | 68 | 60 | 48 | 42 | 36 | 19 |
| Battery 5 | 1630 | 1650 | 1690 | 1740 | 1760 | 1790 | 1810 | 1750 |
|  | 82 | 83 | 83 | 81 | 68 | 60 | 50 | 33 |
|  | 69 | 69 | 69 | 65 | 52 | 49 | 39 | 22 |
| Battery 6 | 1610 | 1630 | 1660 | 1720 | 1760 | 1780 | 1800 | 1740 |
|  | 83 | 84 | 84 | 82 | 73 | 64 | 55 | 28 |
|  | 69 | 69 | 69 | 68 | 62 | 52 | 49 | 28 |
| Battery 7 | 1710 | 1700 | 1740 | 1760 | 1770 | 1790 | 1810 | 1750 |
|  | 82 | 83 | 80 | 75 | 56 | 35 | 28 | 12 |
|  | 69 | 69 | 66 | 54 | 41 | 38 | 28 | 10 |
| Battery 8 | 1680 | 1700 | 1740 | 1760 | 1780 | 1790 | 1810 | 1770 |
|  | 82 | 83 | 81 | 78 | 61 | 48 | 41 | 20 |
|  | 69 | 70 | 67 | 55 | 42 | 38 | 29 | 11 |
| Battery 9 | 1640 | 1660 | 1700 | 1750 | 1770 | 1790 | 1810 | 1740 |
|  | 82 | 83 | 84 | 82 | 69 | 61 | 52 | 29 |
|  | 69 | 70 | 68 | 57 | 44 | 42 | 38 | 13 |
| Battery 10 | 1620 | 1640 | 1670 | 1730 | 1770 | 1790 | 1810 | 1710 |
|  | 83 | 85 | 85 | 83 | 74 | 65 | 56 | 25 |
|  | 70 | 70 | 70 | 62 | 55 | 50 | 47 | 21 |
| Battery 11 | 1610 | 1640 | 1670 | 1720 | 1760 | 1780 | 1800 | 1720 |
|  | 83 | 84 | 84 | 83 | 74 | 65 | 57 | 26 |
|  | 70 | 70 | 70 | 67 | 61 | 51 | 47 | 22 |
| Battery 12 | 1610 | 1640 | 1670 | 1720 | 1760 | 1780 | 1800 | 1720 |
|  | 83 | 84 | 84 | 83 | 75 | 66 | 57 | 26 |
|  | 70 | 70 | 70 | 68 | 63 | 50 | 49 | 20 |
| Battery 13 | 1610 | 1640 | 1670 | 1730 | 1760 | 1780 | 1800 | 1720 |
|  | 83 | 84 | 84 | 83 | 74 | 66 | 58 | 27 |
|  | 70 | 70 | 70 | 69 | 65 | 51 | 50 | 18 |
| Battery 14 | 1610 | 1640 | 1670 | 1730 | 1760 | 1780 | 1800 | 1710 |
|  | 83 | 84 | 84 | 83 | 75 | 65 | 58 | 23 |
|  | 70 | 70 | 70 | 69 | 64 | 51 | 50 | 22 |

TABLE 7

|  | \multicolumn{8}{c|}{Condition} |
|---|---|---|---|---|---|---|---|---|
|  | 9 | 10 | 11 | 12 | 13 | 14 | 15 | 16 |
| Battery 15 | 1610 | 1640 | 1670 | 1730 | 1770 | 1780 | 1800 | 1710 |
|  | 83 | 84 | 84 | 84 | 74 | 65 | 57 | 19 |
|  | 70 | 70 | 70 | 69 | 65 | 53 | 51 | 22 |
| Battery 16 | 1610 | 1640 | 1670 | 1730 | 1770 | 1780 | 1800 | 1700 |
|  | 83 | 84 | 84 | 83 | 75 | 65 | 57 | 20 |
|  | 70 | 70 | 70 | 70 | 69 | 56 | 53 | 24 |
| Battery 17 | 1610 | 1630 | 1660 | 1720 | 1760 | 1780 | 1800 | 1710 |
|  | 83 | 84 | 84 | 83 | 75 | 65 | 58 | 19 |
|  | 70 | 70 | 69 | 69 | 68 | 53 | 51 | 19 |

TABLE 7-continued

| | Condition | | | | | | | |
|---|---|---|---|---|---|---|---|---|
| | 9 | 10 | 11 | 12 | 13 | 14 | 15 | 16 |
| Battery 18 | 1600 | 1630 | 1680 | 1720 | 1750 | 1770 | 1790 | 1690 |
| | 84 | 86 | 86 | 85 | 77 | 69 | 60 | 19 |
| | 68 | 68 | 67 | 66 | 63 | 50 | 48 | 18 |
| Battery 19 | 1630 | 1660 | 1710 | 1750 | 1780 | 1800 | 1820 | 1640 |
| | 83 | 82 | 82 | 82 | 73 | 65 | 56 | 25 |
| | 66 | 66 | 65 | 63 | 60 | 49 | 45 | 18 |
| Battery 20 | 1710 | 1720 | 1730 | 1750 | 1770 | 1790 | 1810 | 1760 |
| | 80 | 75 | 70 | 62 | 45 | 30 | 19 | 6 |
| | 66 | 63 | 60 | 47 | 34 | 25 | 11 | 2 |
| Battery 21 | 1600 | 1610 | 1620 | 1640 | 1650 | 1680 | 1700 | 1650 |
| | 81 | 77 | 72 | 65 | 47 | 33 | 22 | 10 |
| | 64 | 61 | 57 | 44 | 30 | 23 | 9 | 1 |
| Battery 22 | 1740 | 1750 | 1760 | 1780 | 1800 | 1810 | 1820 | 1660 |
| | 75 | 68 | 63 | 48 | 30 | 24 | 11 | 1 |
| | 63 | 50 | 46 | 39 | 27 | 15 | 6 | 0 |
| Battery 23 | 1660 | 1670 | 1680 | 1700 | 1720 | 1740 | 1750 | 1660 |
| | 82 | 77 | 73 | 64 | 48 | 32 | 22 | 8 |
| | 68 | 65 | 65 | 50 | 37 | 29 | 16 | 8 |
| Battery 24 | 1570 | 1590 | 1600 | 1620 | 1640 | 1660 | 1670 | 1600 |
| | 83 | 80 | 75 | 67 | 50 | 35 | 25 | 14 |
| | 66 | 64 | 60 | 47 | 34 | 27 | 13 | 6 |
| Battery 25 | 1690 | 1700 | 1710 | 1730 | 1750 | 1770 | 1780 | 1690 |
| | 76 | 73 | 64 | 53 | 42 | 24 | 12 | 3 |
| | 66 | 63 | 59 | 45 | 31 | 24 | 10 | 1 |
| Battery 26 | 1600 | 1610 | 1620 | 1640 | 1650 | 1660 | 1670 | 1580 |
| | 81 | 76 | 72 | 65 | 48 | 33 | 24 | 8 |
| | 69 | 68 | 64 | 52 | 39 | 31 | 18 | 9 |
| Battery 27 | 1550 | 1560 | 1570 | 1590 | 1600 | 1610 | 1620 | 1550 |
| | 84 | 81 | 77 | 69 | 51 | 37 | 25 | 16 |
| | 68 | 66 | 62 | 49 | 36 | 29 | 15 | 7 |
| Battery 28 | 1620 | 1630 | 1640 | 1660 | 1670 | 1680 | 1690 | 1630 |
| | 78 | 75 | 66 | 54 | 43 | 24 | 13 | 4 |
| | 67 | 65 | 60 | 47 | 33 | 26 | 12 | 4 |

TABLE 8

| | Condition | | | | | | | |
|---|---|---|---|---|---|---|---|---|
| | 17 | 18 | 19 | 20 | 21 | 22 | 23 | 24 |
| Battery 1 | 1700 | 1710 | 1720 | 1740 | 1760 | 1780 | 1800 | 1810 |
| | 84 | 84 | 81 | 77 | 58 | 42 | 27 | 14 |
| | 70 | 70 | 65 | 54 | 42 | 33 | 21 | 10 |
| Battery 2 | 1690 | 1710 | 1720 | 1740 | 1760 | 1780 | 1800 | 1810 |
| | 84 | 85 | 82 | 79 | 62 | 43 | 33 | 16 |
| | 70 | 70 | 66 | 55 | 43 | 34 | 22 | 10 |
| Battery 3 | 1660 | 1680 | 1720 | 1740 | 1760 | 1780 | 1800 | 1810 |
| | 84 | 85 | 84 | 80 | 64 | 50 | 40 | 20 |
| | 70 | 70 | 68 | 58 | 47 | 39 | 28 | 18 |
| Battery 4 | 1640 | 1660 | 1700 | 1740 | 1760 | 1780 | 1800 | 1810 |
| | 84 | 85 | 85 | 81 | 65 | 57 | 46 | 31 |
| | 70 | 70 | 69 | 61 | 51 | 43 | 33 | 22 |
| Battery 5 | 1620 | 1640 | 1680 | 1730 | 1750 | 1780 | 1800 | 1810 |
| | 84 | 85 | 86 | 83 | 70 | 63 | 52 | 39 |
| | 70 | 70 | 70 | 66 | 58 | 48 | 40 | 25 |
| Battery 6 | 1600 | 1620 | 1650 | 1710 | 1750 | 1770 | 1790 | 1810 |
| | 85 | 86 | 87 | 84 | 75 | 66 | 57 | 54 |
| | 70 | 70 | 70 | 70 | 66 | 58 | 51 | 27 |
| Battery 7 | 1700 | 1720 | 1730 | 1750 | 1760 | 1780 | 1800 | 1810 |
| | 84 | 84 | 82 | 77 | 59 | 42 | 28 | 15 |
| | 70 | 70 | 67 | 59 | 44 | 40 | 31 | 13 |
| Battery 8 | 1670 | 1690 | 1730 | 1750 | 1770 | 1780 | 1800 | 1810 |
| | 84 | 85 | 85 | 81 | 64 | 51 | 40 | 21 |
| | 70 | 70 | 68 | 59 | 44 | 41 | 33 | 15 |
| Battery 9 | 1630 | 1650 | 1690 | 1740 | 1760 | 1790 | 1800 | 1810 |
| | 84 | 86 | 87 | 84 | 71 | 64 | 53 | 41 |
| | 70 | 70 | 69 | 60 | 49 | 48 | 40 | 17 |
| Battery 10 | 1610 | 1630 | 1660 | 1720 | 1760 | 1780 | 1800 | 1810 |
| | 85 | 86 | 88 | 85 | 76 | 67 | 58 | 56 |
| | 70 | 70 | 70 | 68 | 60 | 55 | 49 | 21 |

TABLE 8-continued

| | Condition | | | | | | | |
|---|---|---|---|---|---|---|---|---|
| | 17 | 18 | 19 | 20 | 21 | 22 | 23 | 24 |
| Battery 11 | 1600 | 1630 | 1660 | 1710 | 1750 | 1770 | 1790 | 1810 |
| | 85 | 86 | 87 | 85 | 76 | 67 | 59 | 58 |
| | 70 | 70 | 70 | 70 | 67 | 58 | 50 | 19 |
| Battery 12 | 1600 | 1630 | 1660 | 1710 | 1750 | 1770 | 1790 | 1810 |
| | 85 | 86 | 86 | 86 | 77 | 69 | 59 | 59 |
| | 70 | 70 | 70 | 70 | 66 | 60 | 50 | 21 |
| Battery 13 | 1600 | 1630 | 1660 | 1720 | 1750 | 1770 | 1790 | 1810 |
| | 85 | 86 | 87 | 86 | 76 | 67 | 60 | 59 |
| | 70 | 70 | 70 | 71 | 67 | 61 | 51 | 23 |
| Battery 14 | 1600 | 1630 | 1660 | 1720 | 1750 | 1770 | 1790 | 1810 |
| | 85 | 86 | 87 | 86 | 77 | 68 | 60 | 59 |
| | 70 | 70 | 70 | 70 | 68 | 62 | 53 | 20 |

TABLE 9

| | Condition | | | | | | | |
|---|---|---|---|---|---|---|---|---|
| | 17 | 18 | 19 | 20 | 21 | 22 | 23 | 24 |
| Battery 15 | 1600 | 1630 | 1660 | 1720 | 1760 | 1770 | 1790 | 1810 |
| | 85 | 86 | 87 | 85 | 76 | 68 | 59 | 59 |
| | 70 | 70 | 70 | 71 | 70 | 63 | 55 | 23 |
| Battery 16 | 1600 | 1630 | 1660 | 1720 | 1760 | 1770 | 1790 | 1810 |
| | 85 | 86 | 87 | 85 | 77 | 67 | 59 | 58 |
| | 70 | 70 | 71 | 71 | 69 | 68 | 57 | 24 |
| Battery 17 | 1600 | 1620 | 1650 | 1710 | 1750 | 1770 | 1790 | 1810 |
| | 85 | 86 | 87 | 86 | 77 | 67 | 59 | 59 |
| | 70 | 70 | 69 | 69 | 69 | 63 | 52 | 21 |
| Battery 18 | 1590 | 1620 | 1650 | 1710 | 1740 | 1760 | 1780 | 1800 |
| | 85 | 86 | 86 | 86 | 78 | 69 | 62 | 63 |
| | 68 | 68 | 68 | 68 | 65 | 58 | 49 | 20 |
| Battery 19 | 1620 | 1650 | 1680 | 1740 | 1770 | 1790 | 1810 | 1830 |
| | 83 | 84 | 85 | 84 | 75 | 66 | 58 | 59 |
| | 66 | 66 | 66 | 65 | 62 | 56 | 47 | 19 |
| Battery 20 | 1700 | 1710 | 1720 | 1740 | 1760 | 1780 | 1800 | 1760 |
| | 81 | 77 | 73 | 65 | 49 | 38 | 22 | 9 |
| | 67 | 61 | 61 | 50 | 36 | 27 | 15 | 5 |
| Battery 21 | 1590 | 1600 | 1610 | 1630 | 1650 | 1670 | 1690 | 1610 |
| | 82 | 78 | 75 | 67 | 53 | 44 | 25 | 14 |
| | 66 | 63 | 57 | 48 | 32 | 24 | 12 | 3 |
| Battery 22 | 1730 | 1740 | 1750 | 1770 | 1790 | 1800 | 1810 | 1740 |
| | 78 | 73 | 67 | 50 | 37 | 20 | 15 | 3 |
| | 64 | 50 | 47 | 34 | 29 | 20 | 18 | 1 |
| Battery 23 | 1650 | 1660 | 1670 | 1690 | 1710 | 1730 | 1740 | 1650 |
| | 82 | 79 | 75 | 66 | 52 | 40 | 25 | 13 |
| | 69 | 63 | 64 | 52 | 40 | 31 | 19 | 10 |
| Battery 24 | 1570 | 1580 | 1590 | 1610 | 1630 | 1650 | 1660 | 1570 |
| | 83 | 82 | 78 | 69 | 58 | 48 | 27 | 18 |
| | 68 | 66 | 61 | 51 | 35 | 28 | 15 | 6 |
| Battery 25 | 1680 | 1690 | 1700 | 1720 | 1740 | 1760 | 1770 | 1680 |
| | 79 | 73 | 65 | 57 | 49 | 29 | 18 | 5 |
| | 66 | 65 | 60 | 46 | 32 | 24 | 12 | 1 |
| Battery 26 | 1590 | 1600 | 1610 | 1630 | 1640 | 1650 | 1660 | 1560 |
| | 83 | 78 | 75 | 67 | 50 | 40 | 24 | 11 |
| | 70 | 69 | 65 | 53 | 41 | 32 | 21 | 11 |
| Battery 27 | 1540 | 1550 | 1560 | 1580 | 1590 | 1600 | 1610 | 1510 |
| | 84 | 84 | 79 | 71 | 58 | 49 | 28 | 18 |
| | 69 | 68 | 63 | 51 | 37 | 30 | 17 | 8 |
| Battery 28 | 1610 | 1620 | 1630 | 1650 | 1660 | 1670 | 1680 | 1530 |
| | 80 | 75 | 68 | 60 | 51 | 30 | 20 | 7 |
| | 67 | 66 | 61 | 48 | 34 | 26 | 14 | 3 |

In each of the batteries 1-28, the initial discharge capacity tends to increase and the cycle capacity maintenance ratio and the storage capacity maintenance ratio tend to decrease with the rising of upper limit voltage for charging. When the upper limit voltage for charging is 4.8 V as in the conditions 8, 16, and 24, the cycle capacity maintenance ratio and the storage capacity maintenance ratio remarkably decrease, and the initial discharge capacity also decreases. On the other hand, when the upper limit voltage for charging is 4.2 V in the conditions 1, 9, and 17, the initial discharge capacity is low, because the upper limit voltage is not high enough.

Figure 2:
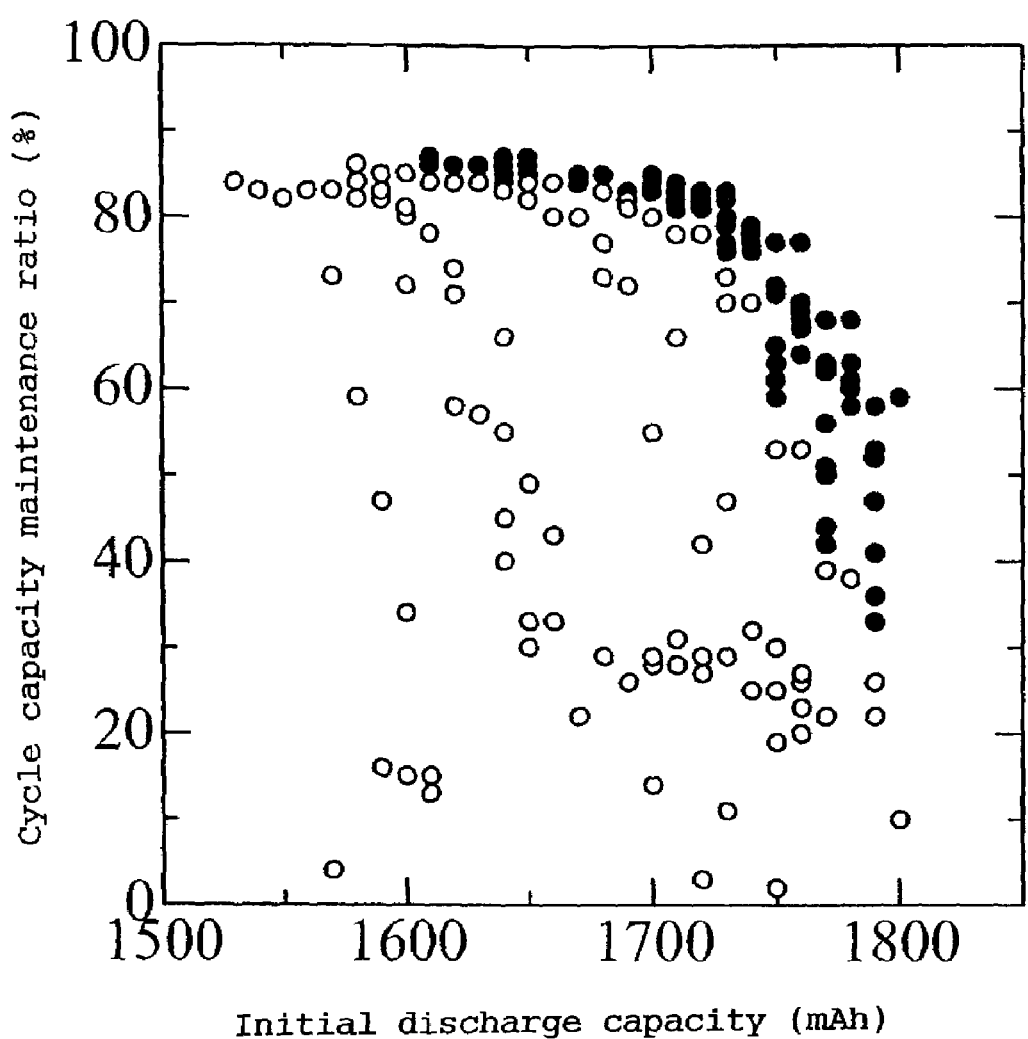
FIG. 2 is a diagram showing the relation between the initial discharge capacity and the cycle capacity maintenance ratio in the case of charging batteries by a constant-current charge manner.
Figure 4:
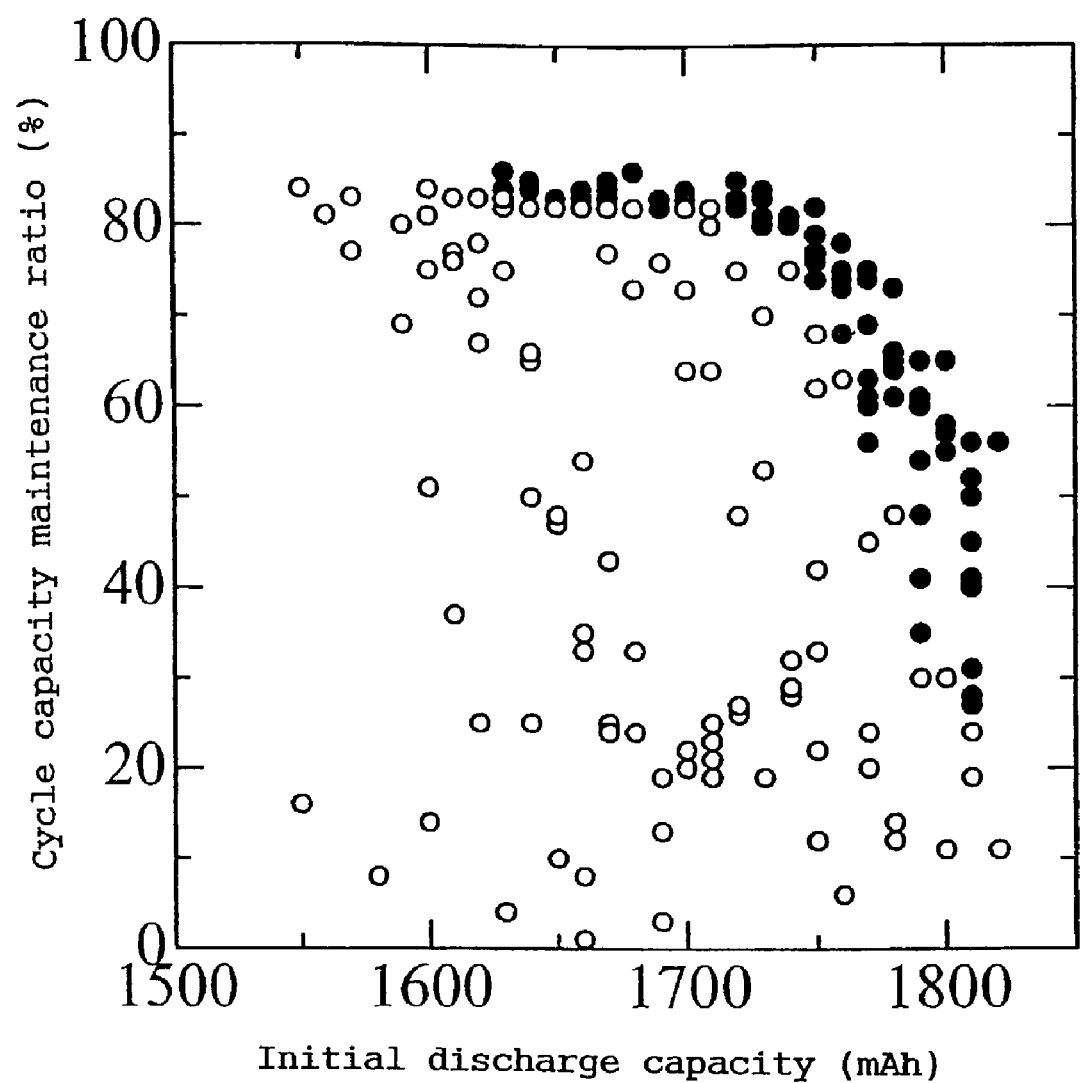
FIG. 4 is a diagram showing the relation between the initial discharge capacity and the cycle capacity maintenance ratio in the case of charging batteries by a constant-current and constant-voltage charge manner.
Figure 5:
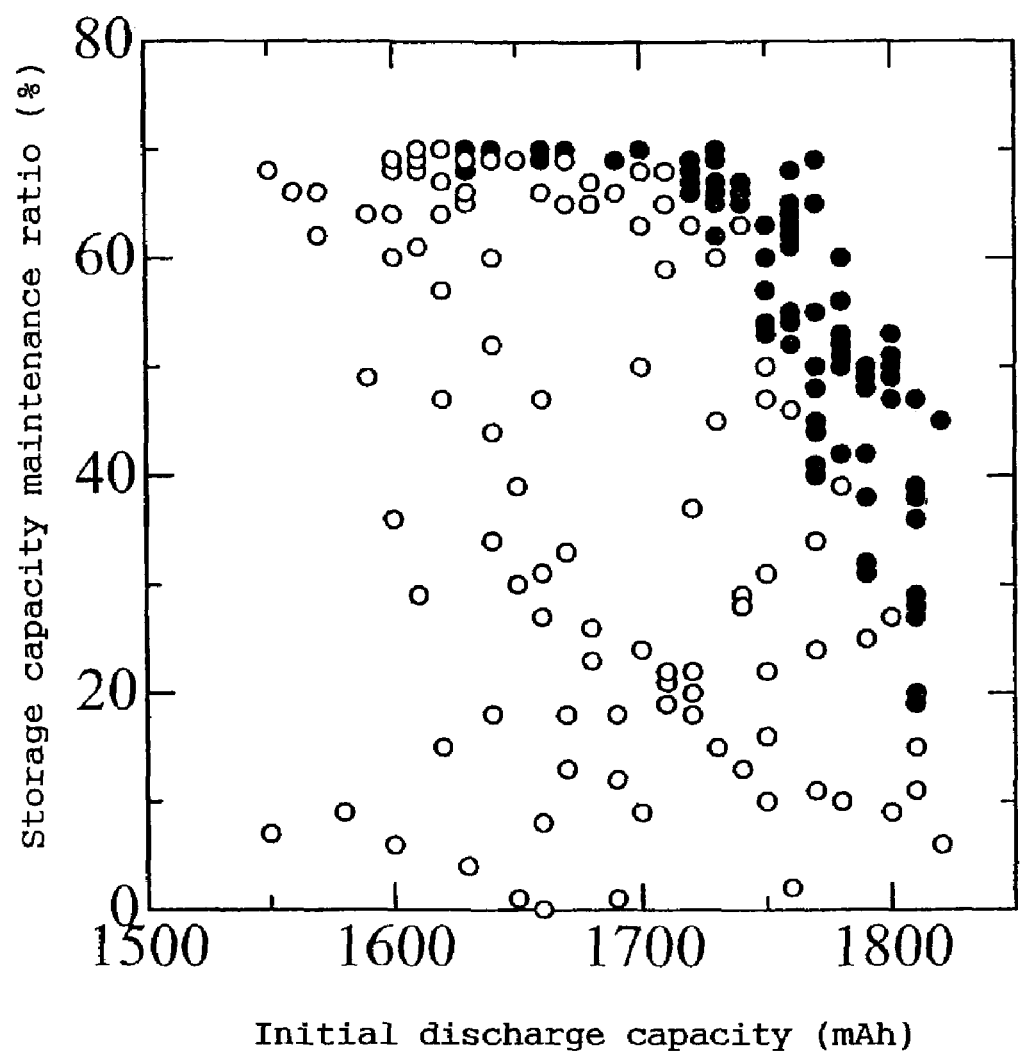
FIG. 5 is a diagram showing the relation between the initial discharge capacity and the storage capacity maintenance ratio in the case of charging batteries by the constant-current and constant-voltage charge manner.
Figure 6:
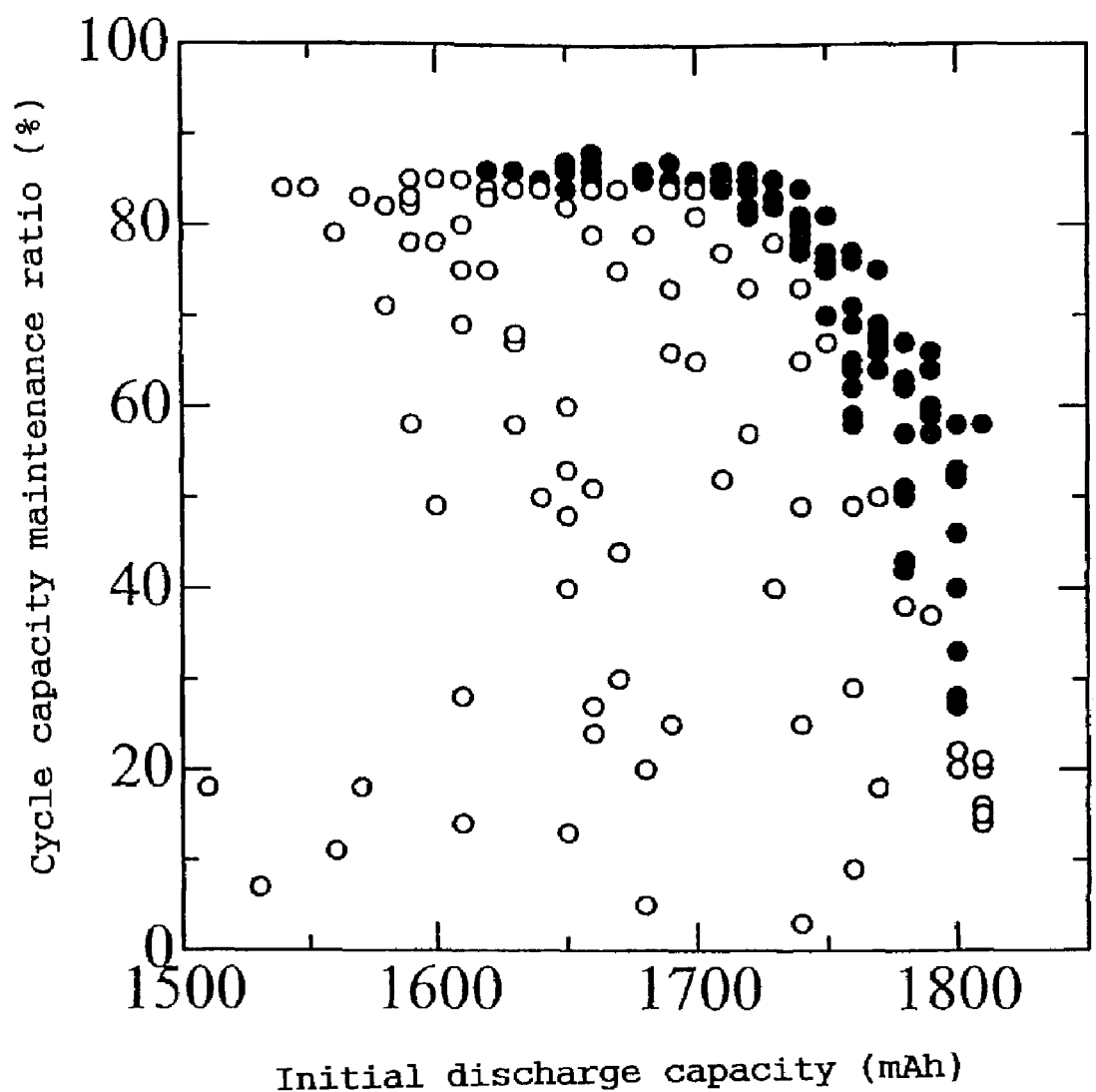
FIG. 6 is a diagram showing the relation between the initial discharge capacity and the cycle capacity maintenance ratio in the case of charging batteries by a constant-current and pulse charge manner.
Figure 7:
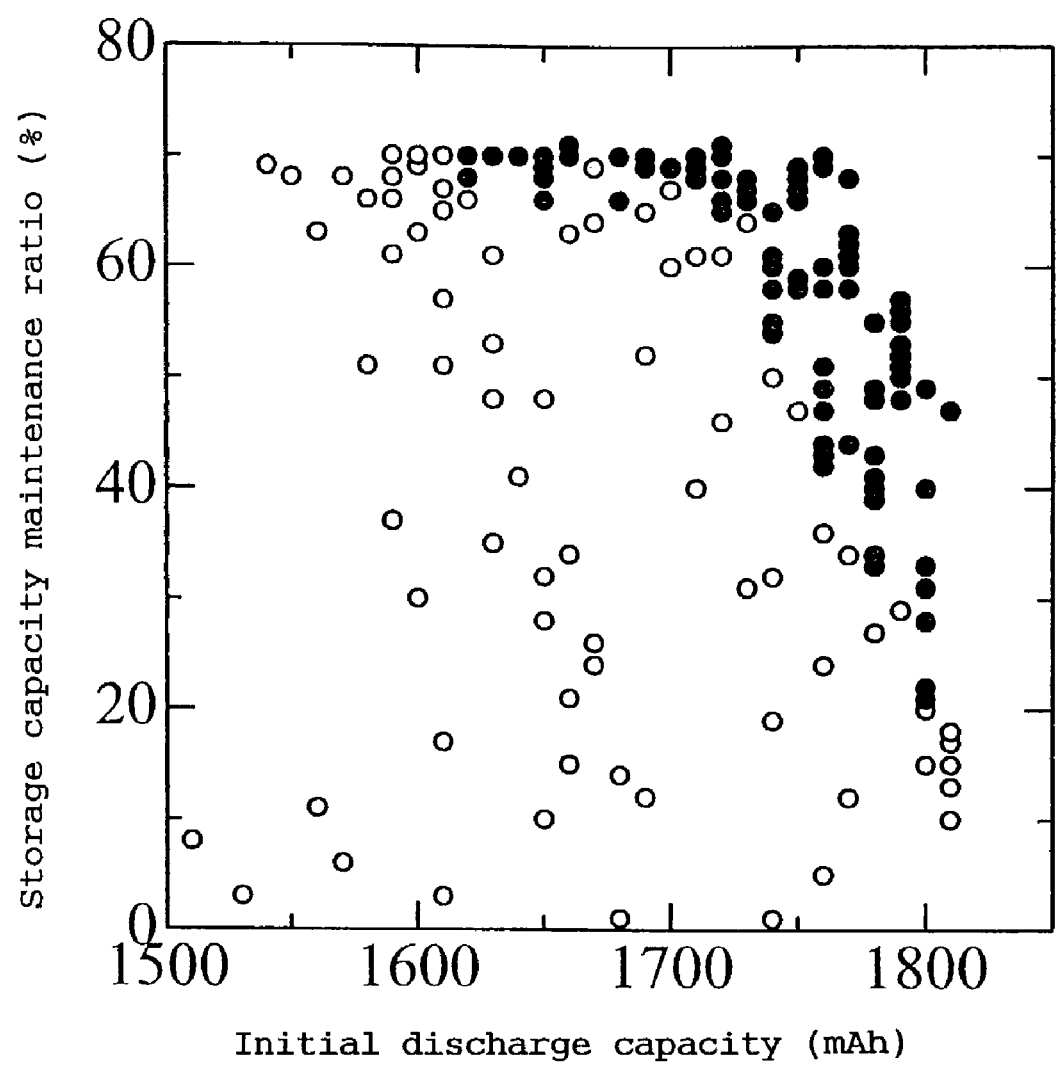
FIG. 7 is a diagram showing the relation between the initial discharge capacity and the storage capacity maintenance ratio in the case of charging batteries by the constant-current and pulse charge manner.

Based on the results of Tables 4-9 above, the relation between the initial discharge capacity and the cycle capacity maintenance ratio is shown in FIGS. 2, 4, and 6, whereas the relation between the initial discharge capacity and the storage capacity maintenance ratio is shown in FIGS. 3, 5, and 7. FIGS. 2 and 3 show evaluation results when the batteries were charged by the constant-current charge manner; FIGS. 4 and 5 show evaluation results when the batteries were charged by the constant-current and constant-voltage charge manner; and FIGS. 6 and 7 show evaluation results when the batteries were charged by the constant-current pulse charge manner. In FIGS. 2 and 3, the black circles (●) represent the results of the example (the combinations of the batteries 1-19 and the conditions 2-7 shown in Tables 4 and 5), and the white circles (○) represent the results of the comparative example (the combinations of the batteries 1-19 and the conditions 1 and 8 shown in Tables 4 and 5, and the combinations of the batteries 20-28 and the conditions 1-8 shown in Tables 5). In FIGS. 4 and 5, the black circles (●) represent the results of the example (the combinations of the batteries 1-19 and the conditions 10-15 shown in Tables 6 and 7), and the white circles (○) represent the results of the comparative example (the combinations of the batteries 1-19 and the conditions 9 and 16 shown in Tables 6 and 7, and the combinations of the batteries 20-28 and the conditions 9-16 shown in Table 7). In FIGS. 6 and 7, the black circles (●) represent the results of the example (the combinations of the batteries 1-19 and the conditions 18-23 shown in Tables 8 and 9), and the white circles (○) represent the results of the comparative example (the combinations of the batteries 1-19 and the conditions 17 and 24 shown in Tables 8 and 9, and the combinations of the batteries 20-28 and the conditions 17-24 shown in Table 9).

FIGS. 2, 4, and 6 indicate that the batteries of the example are higher in the cycle capacity maintenance ratio relative to the initial discharge capacity than the batteries of the comparative example. FIGS. 3, 5, and 7 indicate that the batteries of the example are higher in the storage capacity maintenance ratio relative to the initial discharge capacity than the batteries of the comparative example.

Consequently, it has found out that when a non-aqueous electrolyte secondary battery using $LiNi_{1-y-z}Mn_yCo_zO_2$, wherein y and z satisfy the conditions of $0<y\leq 0.5$, $0\leq z\leq 0.5$, and $0<y+z\leq 0.75$, as a positive electrode active material is charged at an upper limit voltage of 4.25 to 4.70 V, a high cycle capacity maintenance ratio and a high storage capacity maintenance ratio can be obtained at the same time, in addition to an increase in the initial discharge capacity.

Concerning the charge manner in this case, it has found out that the batteries charged by constant-current and constant-voltage charge manner or the constant-current and pulse charge manner have a larger initial discharge capacity and also have a higher cycle capacity maintenance ratio and a higher storage capacity maintenance ratio than the batteries charged by the constant-current charge manner.

As described above, according to the present invention, it is possible to provide a non-aqueous electrolyte secondary battery with high capacity, high reliability, and long life by properly setting the composition of a composite oxide of lithium which is a positive electrode active material and the charging conditions of the battery using this composite oxide of lithium as a positive electrode active material. In addition, when a specific composite oxide of lithium is used as a positive electrode active material, it is possible to provide a charging method which enables to obtain a non-aqueous electrolyte secondary battery having high reliability and long life at the same time as high capacity.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for charging a non-aqueous electrolyte secondary battery, comprising:
   (1) a first step of charging a non-aqueous electrolyte secondary battery at a constant current until the battery voltage reaches an upper limit voltage of 4.25 to 4.70 V, said non-aqueous electrolyte secondary battery comprising a negative electrode including a negative electrode active material, a positive electrode including a positive electrode active material consisting essentially of $LiNi_{1-y-z}Mn_yCo_zO_2$, wherein y and z satisfy $0<y\leq 0.5$, $0\leq z\leq 0.5$ and $0<y+z\leq 0.75$, and a non-aqueous electrolyte; and
   (2) a second step of pulse charging said non-aqueous electrolyte secondary battery below said upper limit voltage, following said first step (1).

2. The method for charging a non-aqueous electrolyte secondary battery, in accordance with claim 1, wherein said negative electrode active material is graphite; said non-aqueous electrolyte comprises a mixture solvent containing ethylene carbonate and ethyl methyl carbonate, and a salt comprising $LiPF_6$; said positive electrode active material consists essentially of $LiNi_{1-y-z}Mn_yCo_zO_2$, wherein y and z satisfy $0.25\leq y\leq 0.5$, $0.25\leq z\leq 0.5$; and said upper limit voltage is 4.30 to 4.50 V.

3. The method for charging a non-aqueous electrolyte secondary battery in accordance with claim 1, wherein said upper limit voltage is 4.4 to 4.7 V.

* * * * *